US012636558B2

(12) United States Patent     (10) Patent No.:    US 12,636,558 B2

Nanke et al.              (45) Date of Patent:      May 26, 2026

(54) GOLF CLUB FITTING DEVICE, METHOD AND PROGRAM

(71) Applicant: Sumitomo Rubber Industries, Ltd., Kobe (JP)

(72) Inventors: Kenta Nanke, Kobe (JP); Kousuke Okazaki, Kobe (JP); Yuto Nakamura, Kobe (JP); Masahiko Ueda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 321 days.

(21) Appl. No.: 18/375,218

(22) Filed: Sep. 29, 2023

(65) Prior Publication Data

US 2024/0108955 A1     Apr. 4, 2024

(30) Foreign Application Priority Data

Sep. 30, 2022    (JP) ................................. 2022-157517

(51) Int. Cl.
| | | |
|---|---|---|
| *A63B 60/42* | (2015.01) | |
| *A63B 24/00* | (2006.01) | |

(Continued)

(52) U.S. Cl.
CPC .......... *A63B 60/42* (2015.10); *A63B 24/0006* (2013.01); *A63B 57/00* (2013.01); *A63B 69/3605* (2020.08); *G09B 19/0038* (2013.01); *A63B 69/3632* (2013.01); *A63B 2102/32* (2015.10); *A63B 2220/34* (2013.01); *A63B 2220/44* (2013.01); *A63B 2220/833* (2013.01)

(58) Field of Classification Search
CPC ..... A63B 60/42; A63B 24/0006; A63B 57/00;

A63B 69/3605; A63B 69/3632; A63B 2102/32; A63B 2220/34; A63B 2220/44; A63B 2220/833; G09B 19/0038

See application file for complete search history.

(56) References Cited

U.S. PATENT DOCUMENTS

| | | | | |
|---|---|---|---|---|
| 9,155,949 | B2 * | 10/2015 | Yataka | ................... A63B 59/30 |
| 9,418,288 | B2 * | 8/2016 | Ishikawa | ................ G06V 40/23 |

(Continued)

FOREIGN PATENT DOCUMENTS

| | | | | |
|---|---|---|---|---|
| JP | 2013226375 | A | * | 11/2013 |
| JP | 2021058304 | A | * | 4/2021 |
| JP | 6911298 | B2 | | 7/2021 |

OTHER PUBLICATIONS

JP-2013226375-A, English Translation (Year: 2013).*
JP-2021058304-A, English Translation (Year: 2021).*

*Primary Examiner* — Ryan D Walsh
(74) *Attorney, Agent, or Firm* — XSENSUS LLP

(57) ABSTRACT

A fitting device for selecting a golf club suitable for a golfer comprises: an acquisition part that acquires measurement values obtained by measuring a golfer's swing motion of a first golf club with a measuring device; and a calculation part that calculates a swing index related to the swing motion based on the measurement values; a determination part that determines, based on the swing index, a second optimum characteristic index indicating characteristics of a shaft for a second golf club different from the first golf club; and a selection part that selects at least a shaft for the second golf club that matches the second optimum characteristic index.

14 Claims, 20 Drawing Sheets

(51) Int. Cl.

| | |
|---|---|
| *A63B 57/00* | (2015.01) |
| *A63B 69/36* | (2006.01) |
| *A63B 102/32* | (2015.01) |
| *G09B 19/00* | (2006.01) |

(56) References Cited

U.S. PATENT DOCUMENTS

| | | | | |
|---|---|---|---|---|
| 9,452,331 | B2 * | 9/2016 | Okazaki | A63B 60/42 |
| 10,384,115 | B2 * | 8/2019 | Okazaki | A63B 71/0622 |
| 2006/0287118 | A1 * | 12/2006 | Wright | A63B 69/3632 |
| | | | | 473/131 |
| 2008/0305882 | A1 * | 12/2008 | Noble | A63B 53/10 |
| | | | | 473/409 |
| 2011/0207560 | A1 * | 8/2011 | Wright | A63B 24/0003 |
| | | | | 473/407 |
| 2013/0165246 | A1 * | 6/2013 | Jeffery | A63B 24/0062 |
| | | | | 473/409 |
| 2015/0224371 | A1 * | 8/2015 | Kato | A61B 5/1122 |
| | | | | 473/300 |
| 2017/0065866 | A1 * | 3/2017 | Okazaki | A63B 69/3605 |
| 2020/0298057 | A1 * | 9/2020 | Wycoff | G06V 40/23 |
| 2021/0101066 | A1 * | 4/2021 | Okazaki | G06V 40/23 |

* cited by examiner

FIG.3

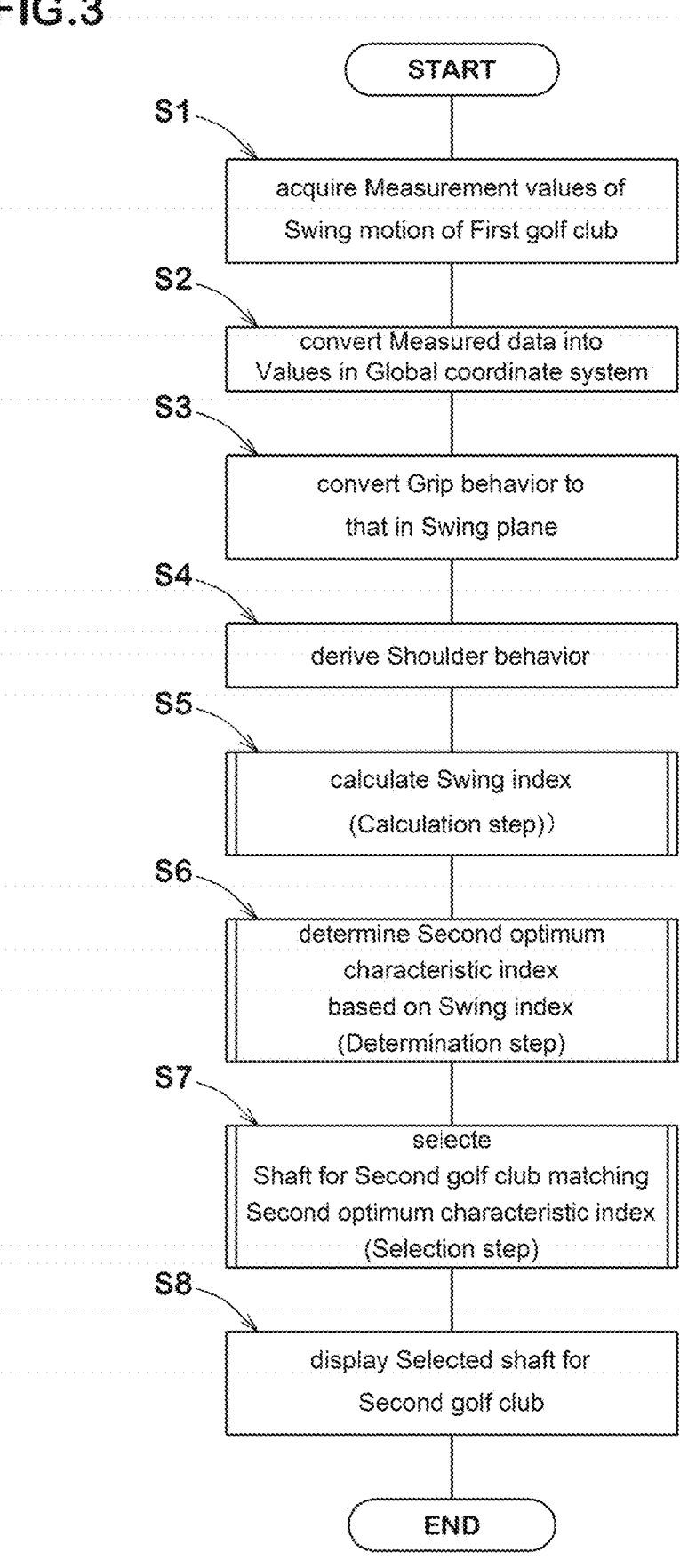

START

S1 acquire Measurement values of
Swing motion of First golf club

S2 convert Measured data into
Values in Global coordinate system

S3 convert Grip behavior to
that in Swing plane

S4 derive Shoulder behavior

S5 calculate Swing index
(Calculation step)）

S6 determine Second optimum
characteristic index
based on Swing index
(Determination step)

S7 selecte
Shaft for Second golf club matching
Second optimum characteristic index
(Selection step)

S8 display Selected shaft for
Second golf club

END

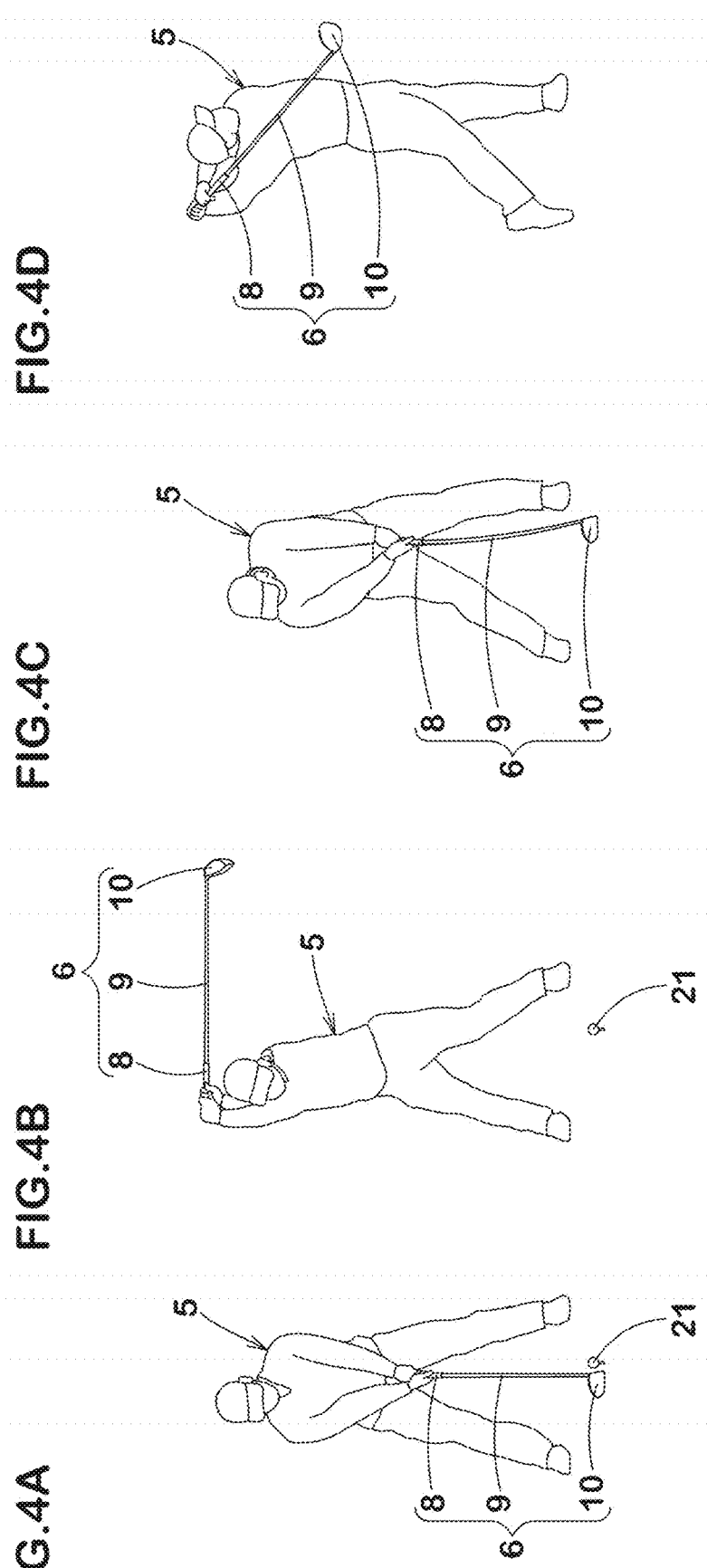

24

36 inches IFC

| IFC | EI[ × 9.8N·m²] | | |
|---|---|---|---|
| 9 | | ~ | 8.295 |
| 8 | 8.295 | ~ | 7.86 |
| 7 | 7.86 | ~ | 7.425 |
| 6 | 7.425 | ~ | 6.99 |
| 5 | 6.99 | ~ | 6.555 |
| 4 | 6.555 | ~ | 6.12 |
| 3 | 6.12 | ~ | 5.685 |
| 2 | 5.685 | ~ | 5.25 |
| 1 | 5.25 | ~ | 4.185 |
| 0 | 4.185 | ~ | 0 |

26 inches IFC

| IFC | EI[ × 9.8N·m²] | | |
|---|---|---|---|
| 9 | | ~ | 5.543 |
| 8 | 5.543 | ~ | 5.306 |
| 7 | 5.306 | ~ | 5.069 |
| 6 | 5.069 | ~ | 4.832 |
| 5 | 4.832 | ~ | 4.595 |
| 4 | 4.595 | ~ | 4.358 |
| 3 | 4.358 | ~ | 4.121 |
| 2 | 4.121 | ~ | 3.884 |
| 1 | 3.884 | ~ | 3.647 |
| 0 | 3.647 | ~ | 0 |

16 inches IFC

| IFC | EI[ × 9.8N·m²] | | |
|---|---|---|---|
| 9 | | ~ | 3.849 |
| 8 | 3.849 | ~ | 3.658 |
| 7 | 3.658 | ~ | 3.467 |
| 6 | 3.467 | ~ | 3.276 |
| 5 | 3.276 | ~ | 3.085 |
| 4 | 3.085 | ~ | 2.894 |
| 3 | 2.894 | ~ | 2.703 |
| 2 | 2.703 | ~ | 2.512 |
| 1 | 2.512 | ~ | 2.321 |
| 0 | 2.321 | ~ | 0 |

6 inches IFC

| IFC | EI[ × 9.8N·m²] | | |
|---|---|---|---|
| 9 | | ~ | 2.94 |
| 8 | 2.94 | ~ | 2.86 |
| 7 | 2.86 | ~ | 2.78 |
| 6 | 2.78 | ~ | 2.7 |
| 5 | 2.7 | ~ | 2.62 |
| 4 | 2.62 | ~ | 2.54 |
| 3 | 2.54 | ~ | 2.46 |
| 2 | 2.46 | ~ | 2.38 |
| 1 | 2.38 | ~ | 2.3 |
| 0 | 2.3 | ~ | 0 |

FIG.19A

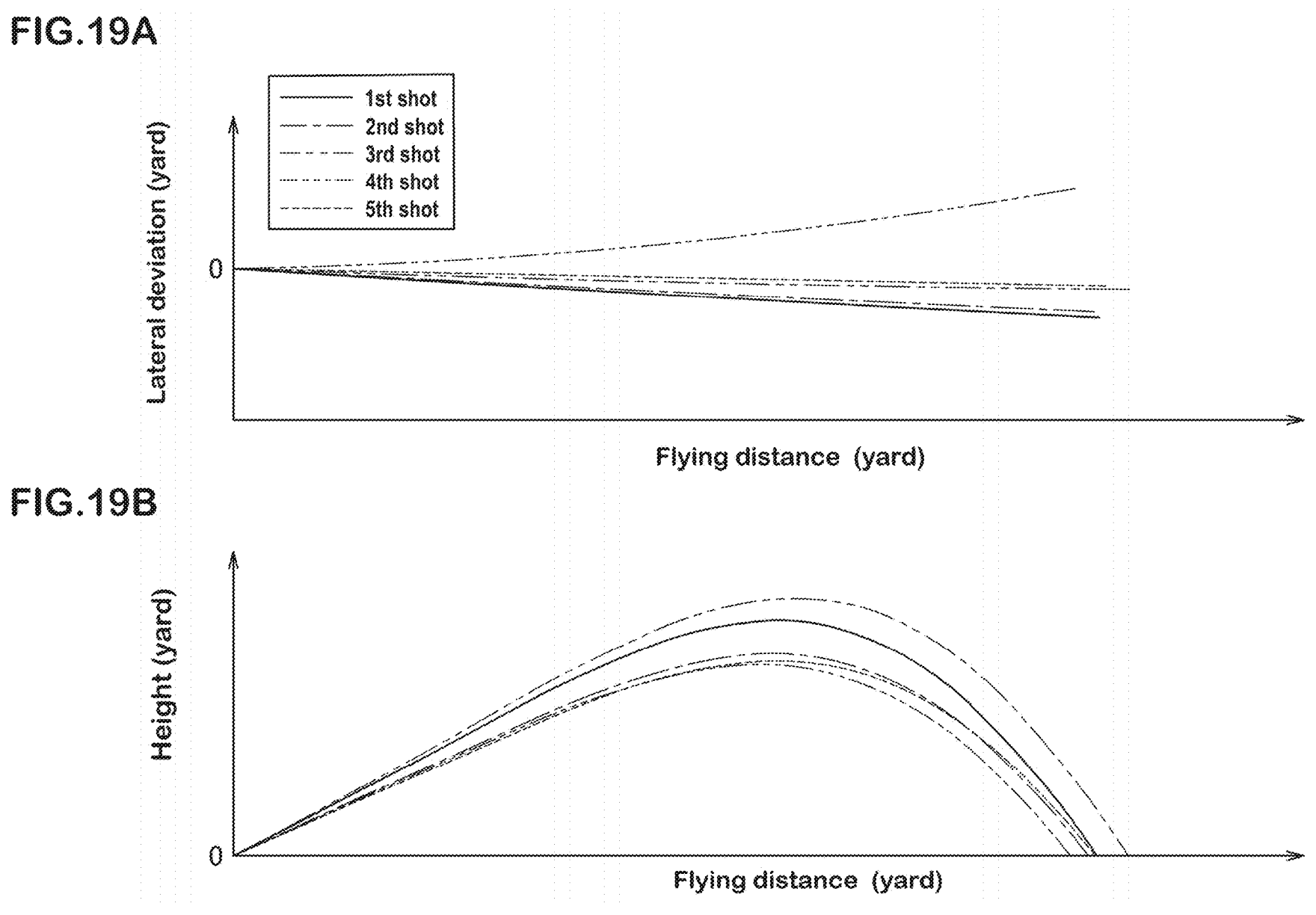

Flying distance (yard)

Lateral deviation (yard)

1st shot
2nd shot
3rd shot
4th shot
5th shot

FIG.19B

Flying distance (yard)

Height (yard)

FIG.20A

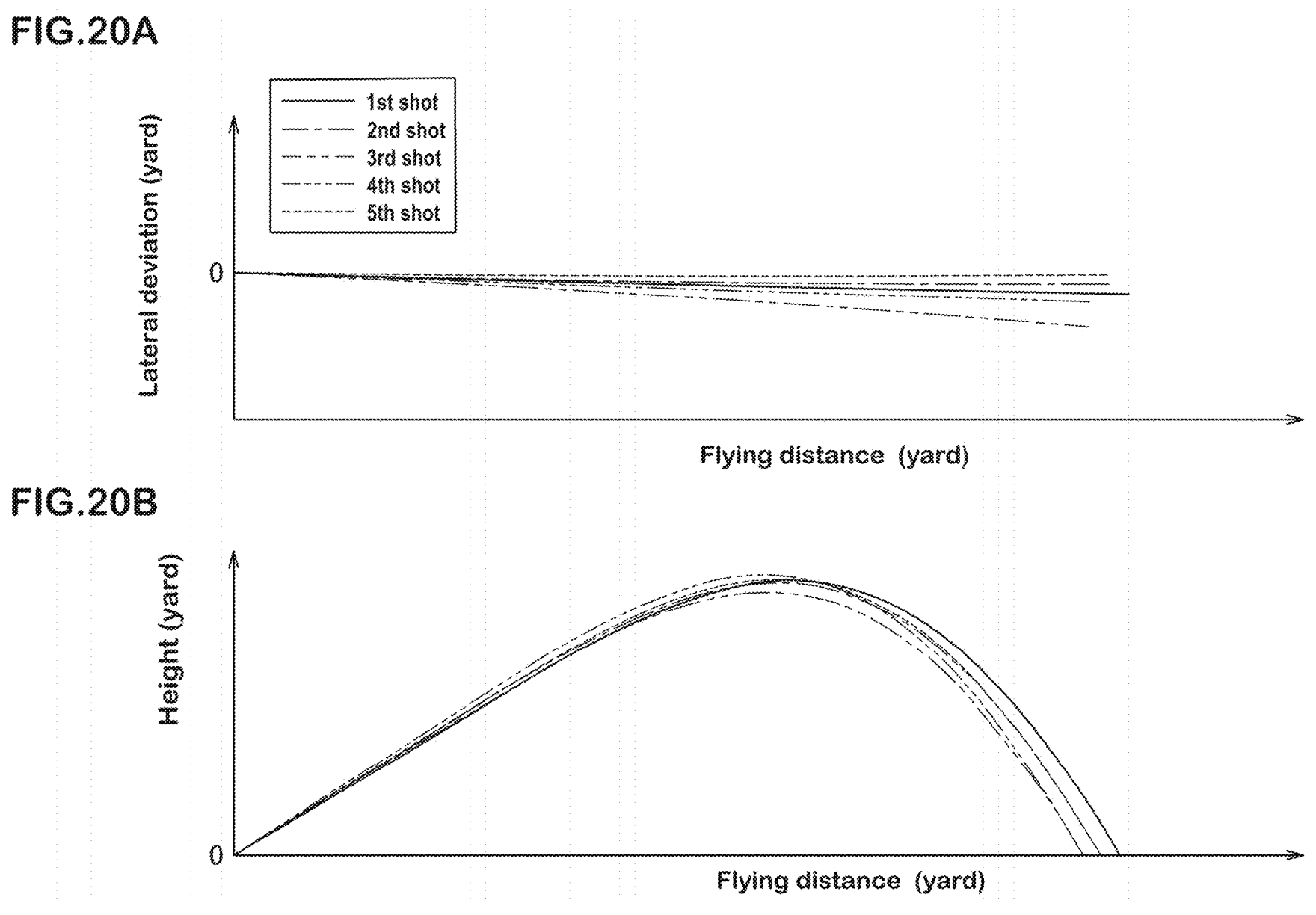

Flying distance (yard)

Lateral deviation (yard)

1st shot
2nd shot
3rd shot
4th shot
5th shot

FIG.20B

Flying distance (yard)

Height (yard)

GOLF CLUB FITTING DEVICE, METHOD AND PROGRAM

CROSS-REFERENCE TO RELATED APPLICATION

The present application claims priority to Japanese Patent Application No. 2022-157517, filed on Sep. 30, 2022, the entire contents of which are incorporated herein by reference.

TECHNICAL FIELD

The present disclosure relates to a fitting device, method and program for facilitating fitting of golf clubs.

BACKGROUND ART

In recent years, various fitting methods have been proposed in which a swing motion of a test club by a golfer is measured using a measuring device, and a golf club suitable for the golfer is selected based on the measurement values.

In Japanese Unexamined Patent Application Publication No. 2002-100001, a driver shaft suitable for a golfer is determined based on the measurement values of the swing motion of the driver or #1 wood club by the golfer.

Patent Document 1: Japanese Patent No. 6,911,298

SUMMARY

According to the present disclosure, a fitting device for selecting a golf club suitable for a golfer, comprises an acquisition part for obtaining measurement values by measuring a swing motion of a first golf club which is a driver, by the golfer with a measuring device;

a calculating part which, based on the measurement values, calculates a swing index related to the swing motion;

a determination part which, based on the swing index, determines a second optimum characteristic index showing characteristics of a shaft for a second golf club different from the first golf club; and a selection part which selects at least a shaft for the second golf club matching the second optimum characteristic index.

BRIEF DESCRIPTION OF THE DRAWINGS

FIG. 3 is a flow chart showing the processing steps of a fitting method as an embodiment of the present disclosure.

FIG. 4A to FIG. 4D are diagrams showing the swing motion of the first golf club by the golfer.

FIG. 14A-FIG. 14C are polygonal line graphs each showing the relationship between the axial position of the shaft and the flexural stiffness (IFC) wherein FIG. 14A shows the flexural stiffness distribution of the ideal shaft, and FIG. 14B and FIG. 14B and FIG. 14C are the flexural stiffness distributions of candidate shafts.

FIG. 19A and FIG. 19B show the hitting result of a #7 iron golf club having a shaft of a comparative example, wherein FIG. 19A is a graph showing the lateral deviation of the trajectory, and FIG. 19B is a graph showing the height of the trajectory.

FIG. 20A and FIG. 20B show the hitting result of a #7 iron golf club having a shaft of the example selected, wherein FIG. 20A is a graph showing the lateral deviation of the trajectory, and FIG. 20B is a graph showing the height of the trajectory.

DETAILED DESCRIPTION

Figure 1:
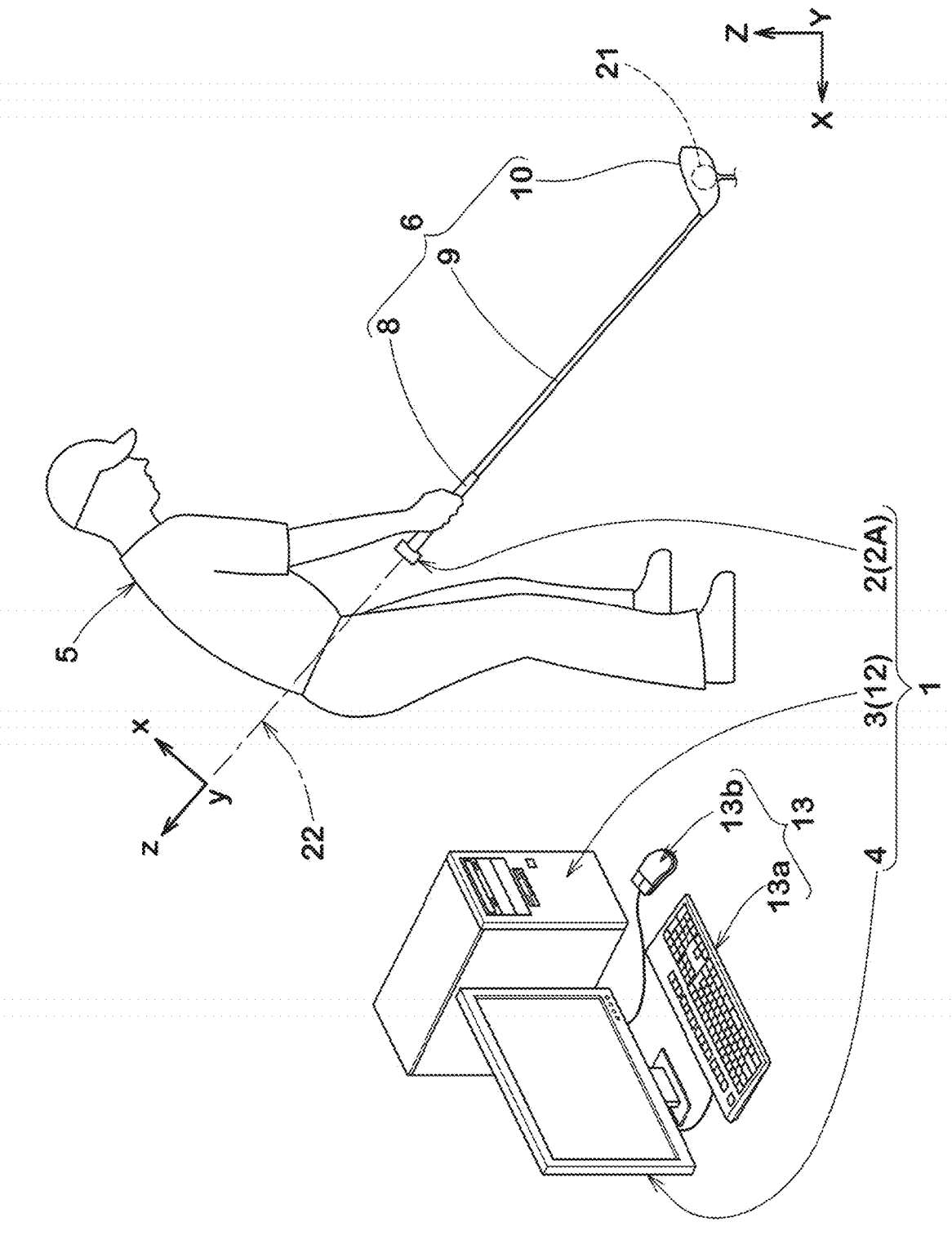
FIG. 1 is a diagram showing an overall configuration of a golf club fitting system as an embodiment of the present disclosure.

With conventional technology, golf clubs which will fit the golfer are determined from the results of the measurement of the driver's swing motion, therefore, the golf clubs are naturally limited to the driver.

On the other hand, at a place or shop where swing motions of various types of clubs are measured for fitting purposes, it may be difficult to spend sufficient time to measure the swing motions of the various types of clubs.

Therefore, it would be very convenient if a golf club different from the driver, such as an iron golf club, could be fitted by measuring the swing motion of the driver.

In view of the above circumstances, among other circumstances, the present disclosure was made, and an objective of the present disclosure, among one or more objects, can be to provide a fitting device, method and program capable of fitting a golf club of a different type from the driver to a golfer by measuring the swing motion of the driver by the golfer.

Therefore, the golf club fitting device, according to one or more embodiments of the present disclosure, can fit a second golf club different from the first golf club (or driver) by measuring the swing motion of the first golf club.

Embodiments of the present disclosure will now be described in detail in conjunction with accompanying drawings.

It should be noted that, in order to aid understanding of the present disclosure, the drawings include exaggerated representations and/or representations different from the dimensional ratios of the actual structure.

Further, when there are multiple modified examples of an element, the same reference numerals are assigned thereto throughout the specification, and redundant description may be omitted.

Furthermore, the specific configurations and structures shown in the drawings and described in the specification, are for understanding the content of the present disclosure, and the present disclosure is not limited thereto.

[Golf Club Fitting System]

The golf club fitting device and fitting system of the present embodiment (these may be hereinafter simply referred to as the "fitting device" and "fitting system"), are used to select a golf club suitable for a golfer.

In the present embodiment, a swing motion of a first golf club which is a driver, is measured for a golfer who desires fitting.

Then, based on measurement values of the swing motion, there is selected specifications of a shaft for a second golf club different from the first golf club.

The second golf club is not particularly limited as long as it is different from the first golf club or the driver. Examples of second golf clubs include iron golf clubs, utility clubs, and fairway woods. In the present embodiment, an iron golf club is exemplified as the second golf club.

FIG. 1 is a diagram showing the configuration of a golf club fitting system 1 of this embodiment.

Figure 2:
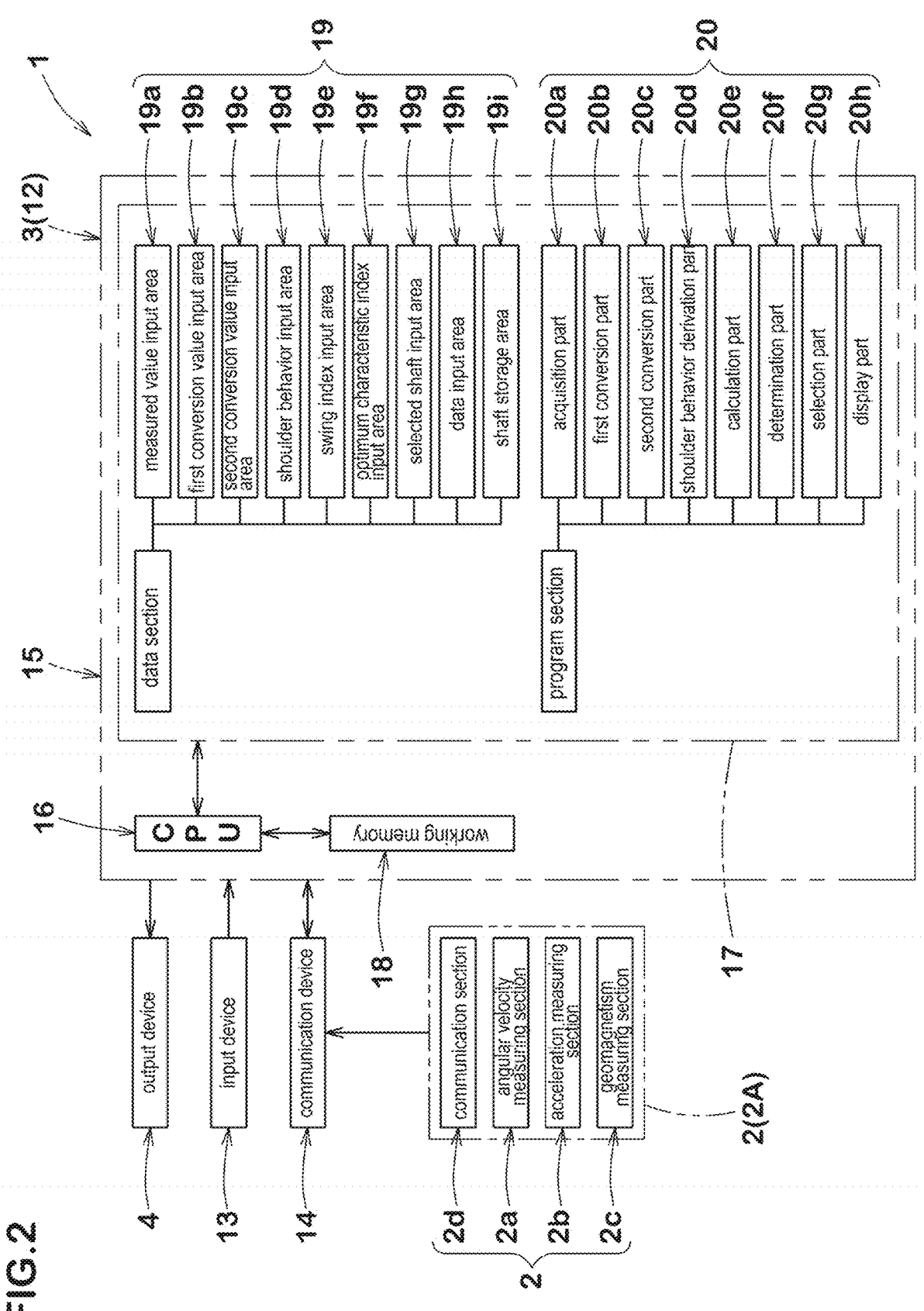
FIG. 2 is a block diagram of the configuration of the golf club fitting system.

FIG. 2 is a block diagram of the fitting system 1 of the present embodiment.

The fitting system 1 of the present embodiment comprises a measuring device 2, a fitting device 3, and an output device 4. The fitting system 1 (fitting device 3) is used to perform a fitting method for selecting a golf club suitable for the golfer 5

[Measuring Device]

The measuring device 2 is for measuring the swing motion of the first golf club 6 made by the golfer 5 as shown in FIG. 1, to obtain measurement values relating thereto. The measuring device 2 in the present embodiment is a swing sensor 2A attached to the first golf club 6. The first golf club 6 is composed of a grip 8, a shaft 9 and a head 10 as shown in FIG. 1, and is configured as a general driver in this example.

The swing sensor 2A in the present embodiment is detachable from the grip 8 or shaft 9 of the first golf club 6, for example. The swing sensor 2A is desirably configured to be small and lightweight so as not to interfere with the swing motion by the golfer 5.

The swing sensor 2A in the present embodiment is capable of measuring predetermined physical quantities (measurement values) from the first golf club 6 during swing motion. As shown in FIG. 2, the swing sensor 2A in the present embodiment comprises an angular velocity measuring section 2a an acceleration measuring section 2b, and a geomagnetism measuring section 2c so that the swing sensor 2A can measure the angular velocity of the grip, the acceleration of the grip, and the earth's magnetism at the grip with respect to the first golf club 6 during a swing. The swing sensor 2A may be configured to measure other physical quantities in addition to these physical quantities.

The swing sensor 2A in the present embodiment measures the angular velocity of the grip, the acceleration of the grip, and the earth's magnetism at the grip, around at least one axis of the three-dimensional local orthogonal coordinate system associated with the first golf club 6.

As shown in FIG. 1, the x-axis of the local orthogonal coordinate system is set parallel with the toe-heel direction of the head 10; the y-axis of the local orthogonal coordinate system is set parallel with the normal direction of the face surface; and the z-axis of the local orthogonal coordinate system is set parallel with the axial direction of the shaft 9 of the first golf club 6.

In the present embodiment, around each of the three axes, the swing sensor 2A can be measure the angular velocity of the grip, the acceleration of the grip, and the earth's magnetism at the grip at a predetermined sampling period (for example, 1 millisecond) during the swing motion.

As shown in FIG. 2, the swing sensor 2A in the present embodiment includes a communication section 2d for transmitting the measurement values to the fitting device 3. In the present embodiment, the swing sensor 2A can transmit the measurement values for each swing motion (hit one ball).

Preferably, the communication section 2d is configured to use a wireless transmitting system so as not to interfere with the swing motion. However, as another example, the communication section 2d may be wired. Further, the swing sensor 2A may include a removable storage medium (not shown). With such storage medium, the measurement values of the swing motion can be stored, and the fitting device 3 may be configured to read the stored measurement values therefrom.

[Fitting Device]

The fitting device 3 is configured by a computer 12, for example. Examples of the computer 12 include desktop computers, notebook computers, tablet computers, smart phones, cloud servers, and the like. In the present embodiment, a desktop computer is adopted as the computer 12.

As shown in FIG. 2, the fitting device 3 of the present embodiment is, for example, composed of an input device 13, a communication device 14, and an arithmetic processing device 15.

For the input device 13, a keyboard 13a and a mouse 13b are used in this example as shown in FIG. 1. Through such input device 13, instructions and the like necessary for executing the fitting method can be input to the arithmetic processing device 15 as shown in FIG. 2

[Communication Device]

The communication device 14 in the present embodiment is communicably connected to the communication section 2d of the swing sensor 2A as shown in FIG. 2. Such communication device 14 can receive the measurement values obtained by the swing sensor 2A, and the received measurement values are taken into the fitting device 3. When the measurement values are taken into the fitting device 3 via the above-described storage medium, the fitting device 3 may be provided with a reading device capable of reading the measurement values stored in the storage medium.

[Arithmetic Processing Device]

The arithmetic processing device 15 in the present embodiment is, for example, composed of an arithmetic part (CPU) 16 performing various arithmetic operations, a storage part 17 which stores data, programs, etc., and a working memory 18.

[Storage Part]

The storage part 17 is a non-volatile storage device formed from, for example, a magnetic disk, optical disk, SSD, or the like. The storage part 17 in the present embodiment includes a data section 19 and a program section 20.

[Data Section]

The data section 19 is for storing the data (information) necessary fir the golf club selection, calculation results, and the like. The data section 19 in the present embodiment includes a measured value input area 19a, a first conversion value input area 19b, a second conversion value input area 19c, a shoulder behavior input area 19d, a suing index input area 19e, an optimum characteristic index input area 19f, a selected shaft input area 19g, a data input area 19h, and a shaft storage area 19i. Note that the data section 19 is not limited to such example, and for example, part of these areas may be omitted, or an area for storing other data may be further included. The details of the data input to the data section 19 will be described later

[Program Section]

The program section 20 corresponds to a program (computer program) necessary for selecting a golf club. By executing the program section (program) 20 by the arithmetic part 16, the computer 12 functions as specific means as described in details later.

The program section 20 in the present embodiment includes an acquisition part 20a, a first conversion part 20b, a second conversion part 20c, a shoulder behavior derivation part 20d, a calculation part 20e, a determination part 20f, a selection part 20g, and a display part 20h Note that the program section 20 is not limited to such example, and for example, part of these procedures may be omitted, or a program section (not shown) having other functions may be further included. The functions of the program section will be described in details later.

[Output Device]

The output device 4 is for outputting the information about the selected shaft for the second golf club. The output device 4 in the present embodiment is a display device e.g. LCD display, but may be a printer and the like, for example. In this example, the output device 4 may include a LCD display and a printer.

[Fitting Method]

Next, the fitting method of the present embodiment will be described FIG. 3 is a flow chart showing the processing steps of the fitting method of the present embodiment. Each step of the fitting method of the present embodiment is implemented by the fitting device 3 (computer 12) shown in FIGS. 1 and 2.

[Acquisition of Measurement Values of Swing Motion of First Golf Club]

In the fitting method of the present embodiment, first, the swing motion of the first golf club 6 by the golfer 5 is measured as shown in FIG. 1, and measurement values are acquired (step S1). In the present embodiment, by the measuring device 2 (swing sensor 2A) attached to the first golf club 6, the swing motion is measured to obtain measurement values relating to the swing motion.

In the step S1 in the present embodiment, first, the acquisition part 20a included in the program section 20 as shown in FIG. 2 is read into the working memory 18. The acquisition part 20a corresponds to a program for acquiring the measurement values of the swing motion of the first golf club 6. The acquisition part 20a is implemented by the calculating part 16, so the computer 12 can function as means for acquiring the measurement values of the swing motion.

In the step S1 in the present embodiment, the first golf club 6 to which the swing sensor 2A shown in FIG. 1 is attached is gripped by the golfer 5 who desires fitting. The first golf club 6 is not particularly limited as long as it is a drier. For example, the first golf club 6 may be selected from a club of a professional model having professional specifications, a club of an average model suitable for an average golfer, and a personal club owned by the golfer 5, as appropriate based on the preference, experience or the like of the golfer 5.

In the step S1 in the present embodiment, the golf 5 gripping the first golf club 6 makes a swing motion. The swing motion includes, for example, a hitting motion of a golf ball 21, namely, the motion at the time of hitting the golf ball 21. By the swing sensor 2A, values during the swing motion are measured. In the present embodiment, in an xyz local orthogonal coordinate system, the following vectors: the grip's acceleration(ax, ay, az), the grip's angular velocity ($\omega$x, $\omega$y, $\omega$z), and the earth's magnetism(mx, my, mz) at the grip are measured.

These measurement values by the swing sensor 2A are transmitted to the communication device 14 of the fitting device 3 via the communication section 2d as shown in FIG. 2. Thereby, the measurement values are received by the communication device 14, and the received measurement values are stored in the measured value input area 19a of the data section 19 by the acquisition part 20a. In the present embodiment, for each swing motion (hitting one ball), the measurement values are transmitted from the swing sensor 2A to the communication device 14 and stored in the measured value input area 19a.

FIGS. 4(a) to 4(d) show the swing motion of the first golf club 6 by the golfer 5 at some time points.

In the present embodiment, it is preferable to obtain time-series measurement values from the address shown in FIG. 4A to the impact shown in FIG. 4C through the top shown in FIG. 4B in the swing motion. The measurement values may be obtained from the time point at the address shown in FIG. 4A to the time point at the finish shown in FIG. 4D. The number of swing motions made by the golfer is not particularly limited, but is preferably two or more, more preferably three or more, still more preferably five or more. In this case, the measurement values of the swing motion obtained multiple times are averaged, and the average value can be used for subsequent procedures. Further, it is preferable to remove abnormal values due to missed shots, measurement errors, and the like.

[Convert Measured Data to Global Orthogonal Coordinate System Values]

Next, in the fitting method of the present embodiment, the measured values in the local orthogonal coordinate system are converted into values in a global orthogonal coordinate system (step S2).

In the step S2 in the present embodiment, first, the measured values stored in the measured value input area 19a as shown in FIG. 2 are read into the working memory 18. Further, the first conversion part 20b included in the program section 20 is read into the working memory 18.

The first conversion part 20b corresponds to a program for convening the values in the local orthogonal coordinate system of the measurement data into values in the global orthogonal coordinate system.

By executing the first conversion part 20b by the calculating part 16, the computer 12 can function as means for converting the values of the measurement data in the local orthogonal coordinate system into the values in the global orthogonal coordinate system.

The global orthogonal coordinate system in the present embodiment is an orthogonal coordinate system as shown in FIG. 1, wherein X-axis is in a direction (depth direction) from the abdomen toward the back of the golf 5; Y-axis is in a direction parallel to the ground plane and from the hitting point of the ball toward the target point (ball flying line direction), and Z-axis is in a direction (height direction) from vertically downward to upward.

In the step S2 in the present embodiment, the grip's acceleration(ax, ay, az) measured in the local orthogonal coordinate system is converted into the grip's acceleration (aX, aY, aZ) in the global orthogonal coordinate system.

Further, the grip's angular velocity($\omega$x, $\omega$y, $\omega$z) measured in the local orthogonal coordinate system is converted into the grip's angular velocity($\omega$X, $\omega$Y, $\omega$Z) in the global orthogonal coordinate system.

In the step S2 in the present embodiment, the time-series data about the converted grip's acceleration(aX, aY, aZ) in the global orthogonal coordinate system (namely, time-series data from the address to the impact shown in FIGS. 4A to 4C), are integrated. Thereby, the grip's velocity(vX, vY, vZ) in the global orthogonal coordinate system from the address to the impact is derived. The derived grip's velocity (vX, vY, vZ) and the converted grip's angular velocity($\omega$X, $\omega$Y, $\omega$Z) are treated as the behavior of the grip 8 in the global orthogonal coordinate system in the subsequent procedures.

In the present embodiment, conversion to the global orthogonal coordinate system and derivation of the grip's velocity(vX, vY, vZ) can be performed, for example, based on the procedure described in the first conversion step of Patent Document 1 above. The grip's acceleration(aX, aY, aZ), grip's angular velocity($\omega$X, $\omega$Y, $\omega$Z), and grip's velocity(vX, vY, vZ) in the global orthogonal coordinate system are stored in the first conversion value input area 19b (shown in FIG. 2).

[Convert to Grip Behavior in Swing Plane]

Next, in the fitting method of the present embodiment, the behavior of the grip 8 in the global orthogonal coordinate system (namely, the converted grip's angular velocity($\omega$X, $\omega$Y, $\omega$Z) and the derived grip velocity(vX, vY, vZ) is converted into a behavior of the grip 8 within the swing plane 22 (shown in FIG. 1) (step S3).

In the step S3 in the present embodiment, first, the grip's angular velocity($\omega$X, $\omega$Y, $\omega$Z) and the grip's velocity(vX, vY, vZ) in the global orthogonal coordinate system stored in the first conversion value input area 19b shown in FIG. 2, are read into the working memory 18.

Further, the second conversion part 20c included in the program section 20 is read into the working memory 18. The second conversion part 20c corresponds to a program for converting the behavior of the grip 8 in the global orthogonal coordinate system into the behavior of the grip 8 within the swing plane 22. By executing the second conversion part 20c by the calculating part 16, the computer 12 can function as a means for converting the behavior of the grip 8 in the global orthogonal coordinate system to the behavior of the grip 8 within the swing plane 22

The swing plane 22 (shown in FIG. 1) is a plane including the origin of the global orthogonal coordinate system and being parallel to the Y-axis and parallel to the shaft 9 at the time of impact.

In the step S3 in the present embodiment, the grip's velocity(vX, vY, vZ) and the grip's angular velocity($\omega$X, $\omega$Y, $\omega$Z) in the global orthogonal coordinate system are projected onto the swing plane 22. Thereby, the behavior of the grip 8 within the swing plane 22 (grip's velocity(vpX, vpY, vpZ) and grip's angular velocity($\omega$pX, $\omega$pY, $\omega$pZ)) can be calculated (converted).

The conversion from the behavior of the grip 8 in the global orthogonal coordinate system to the behavior of the grip 8 within the swing plane 22 can be performed, for example, based on the procedure described in the second transformation step of Patent Document 1 above. The behavior of the grip 8 within the swing plane 22 is stored in the second conversion value input area 19c (shown in FIG. 2).

[Derivation of Shoulder Behavior]

Next, in the fitting method of the present embodiment, based on the behavior of the grip 8 within the swing plane 22 (the grip's velocity(vpX, vpY, vpZ) and the grip's angular velocity($\omega$pX, $\omega$pY, $\omega$pZ)), the behavior of the shoulder of the player within the swing plane 22 is derived (step S4).

In the step S4 in the present embodiment, first, the grip behavior (the grip's velocity(vpX, vpY, vpZ) and grip's angular velocity($\omega$pX, $\omega$pY, $\omega$pZ)) is read into the working memory 18. Further, the shoulder behavior derivation part 20d included in the program section 20 is read into the working memory 18. The shoulder behavior derivation part 20d corresponds to a program for deriving the behavior of the shoulder within the swing plane 22 based on the behavior of the grip within the swing plane 22. By executing the shoulder behavior derivation part 20d by the calculating part 16, the computer 12 can function as means for deriving the behavior of the shoulder within the swing plane 22.

In the step S4 in the present embodiment, as the behavior of the shoulder within the swing plane 22, the angular velocity around the shoulder (arm angular velocity) $\omega$1 from the top to the impact within the swing plane 22 is derived. The angular velocity $\omega$1 around the shoulder can be derived, for example, based on the procedure described in the shoulder behavior derivation process of Patent Document 1 above. The angular velocity $\omega$1 around the shoulder is stored in the shoulder behavior input area 19d (shown in FIG. 2) as the behavior of the shoulder within the swing plane 22.

[Calculation of Swing Index (Calculation Step)]

Next, in the fitting method of the present embodiment, based on measurement values of the swing motion of the first golf club 6, a swing index relating to the swing motion is calculated (calculation step S5). In the present embodiment, the behavior of the grip within the swing plane 22 converted from the measurement values of the swing motion, and the behavior of the shoulder within the swing plane 22 are used to calculate the swing index.

In the calculation step S5 in the present embodiment, first, the behavior of the grip in the swing plane 22 (the grip's velocity(vpX, vpY, vpZ) and the grip's angular velocity ($\omega$pX, $\omega$pY, $\omega$pZ)) stored in the second conversion value input area 19c shown in FIG. 2, are read into the working memory 18. Further, the behavior of the shoulder (angular velocity $\omega$1 around the shoulder) within the swing plane 22 stored in the shoulder behavior input area 19d is read into the working memory 18. Furthermore, the calculation part 20e included in the program section 20 is read into the working memory 18. The calculation part 20e corresponds to a program for calculating the swing index based on the measurement values of the swing motion. By executing the calculation part 20e by the calculating part 16, the computer 12 can function as means for calculating the swing index.

The swing index can be set as appropriate as long as it relates to the swing motion. The swing index in the present embodiment includes a first swing index and a second swing index.

Figure 5:
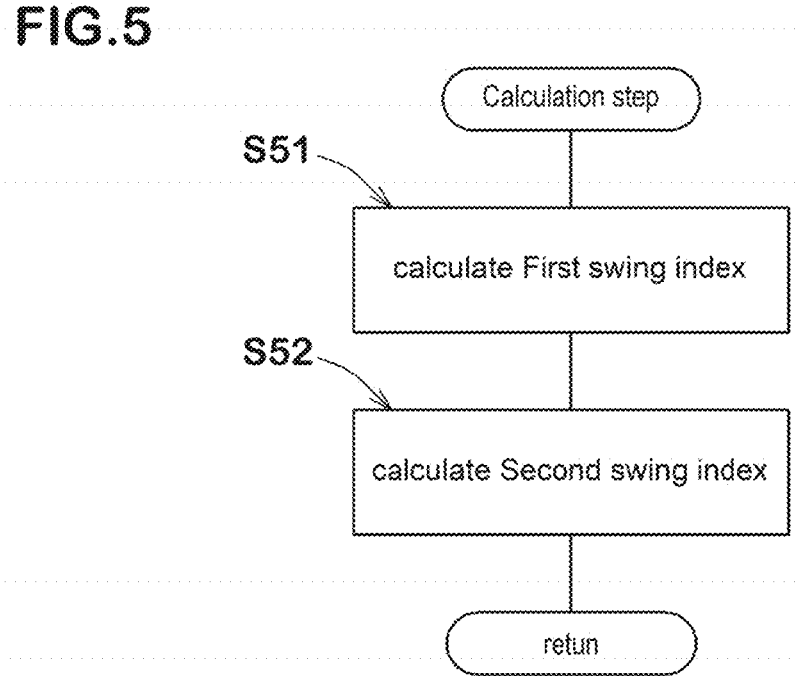
FIG. 5 is a flow chart showing an example of a calculation step of the fitting method.

FIG. 5 shows a flow chart showing an example of the procedure of the calculation step S5 in the present embodiment.

[Calculation of First Swing Index]

In the calculation step S5 in the present embodiment, first, the first swing index is calculated (step S51). As the first swing index in the present embodiment, the first swing index already been described in detail in Patent Document 1 is used. That is, the first swing index includes at least one of an arm output power P1, a club input power P2, an arm energy E_ave, and a torque. The first swing index will be described below.

The arm output power P1 is an index indicating the power output from the arms of the golfer 5 during the swing motion of the first golf club 6 (from the top shown in FIG. 4B to the impact shown in FIG. 4C). Such arm output power P1 is treated as a substitute for the degree of acceleration of the golfer's arms (force to release the coking of wrists).

The arm output power P1 in the present embodiment is calculated using the angular velocity around the shoulder (angular velocity of the arms) ω1, a torque Tg1 around the center of gravity of the arms, and a torque Tg2 around the center of gravity of the first golf club 6. Further, in the present embodiment, an average arm output power during the swing motion P1_ave (hereinafter simply referred to as the "average arm output power") is calculated. This average arm output power P1_ave can be calculated by integrating the arm output power P1 in an integration interval from a time point tt at the top to a time point tm at which the arm output power P1 reaches its maximum value, and dividing the integrated value D1 by the interval of integration. These arm output power P1 and average arm output power P1_ave can be calculated, for example, based on the procedure described in the first index calculation step of Patent Document 1 above.

The club input power P2 is an index indicating the power input to the first golf club 6 during the swing motion of the first golf club 6. Such club input power P2 is treated as a substitute for the momentum given to the first golf club 6 (force to accumulate the coking of wrists).

The club input power P2 in the present embodiment is calculated using a velocity vector vg of the grip 8 and a restraining force R2 generated in the grip 8 from the top shown in FIG. 4B to the impact shown in FIG. 4C. Further, in the present embodiment, the average club input power P2_ave during the swing motion (hereinafter sometimes simply referred to as the "average club input power") is calculated. This average club input power P2_ave can be calculated by integrating the club input power P2 in an integration interval from the time point tt at the top to the time point tn at which the club input power P2 reaches its maximum value, and dividing this integrated value by the integration interval. These club input power P2 and average club input power P2_ave can be calculated, for example, based on the procedure described in the first index calculation step of Patent Document 1 above.

The arm energy E_ave is an index which indicates the energy exerted by the golfer 5 during the swing motion of the first golf club 6. The arm energy E_ave is calculated based on the amount of work EI of the arms from the time point tt at the top to a time point tc at which the power of the arms changes from positive to negative after the top shown in FIG. 4B in the swing motion. Such arm energy E_ave can be calculated, for example, based on the procedure described in the first index calculation step of Patent Document 1 above.

The torque is an index indicating the torque (rotational force) exerted by the golfer 5 during the swing motion of the first golf club 6. The torque in the present embodiment includes a total shoulder torque Tti and an average shoulder torque T_ave.

The total shoulder torque Tti is a value obtained by integrating a torque T1 around the shoulder exerted by the golfer 5 during the swing motion from the top shown in FIG. 4B to the impact shown in FIG. 4C. The average shoulder torque T_ave is calculated by dividing the total shoulder torque Tti by the time period from the top to the impact. The total shoulder torque Tti and the average shoulder torque T_ave can be calculated, for example, based on the procedure described in the first index calculation step of Patent Document 1 above.

In the step S51 in the present embodiment, the head speed Vh is calculated as the first swing index. The head speed Vh is the speed of the club head at the impact shown in FIG. 4C when the golf 5 swings the first golf club 6. Such head speed Vh can be calculated based on the release timing tr of the coking of wrists and the arm energy E_ave, for example, based on the procedure described in the first index calculation step of Patent Document 1 above.

In the step S51 in the present embodiment, as the first swing index, an average arm output power (force to release the coking of wrists) P1_ave and an average club input power (force to accumulate the coking of wrists) P2_ave are calculated. Note that the first swing index may include the above-described head speed Vh, arm energy E_ave and the like, if necessary. The first swing index is stored in the swing index input area 19e (shown in FIG. 2).

[Calculation of Second Swing Index]

Next, in the calculation step S5 in the present embodiment, a second swing index is calculated (step S52). As the second swing index in the present embodiment, a feature quantities which characterizes the swing motion of the first golf club 6 by the golf 5 is used. The feature quantities is not particularly limited as long as it can characterize the swing motion. In the present embodiment, the feature quantities described in Patent Document 1 is used. That is, the feature quantities (second swing index) is an index relating to the angular velocity of the first golf club 6 in the direction of the coking of wrists during the swing motion. The feature quantities is described below.

The swing motion of the golfer transitions from the address shown in FIG. 4A to the impact shown in FIG. 4C via the top shown in FIG. 4B. At that time, the inertia of the head 10 causes bending of the shaft 9 of the first golf club 6. This bending is transmitted from the hand side to the tip side of the shaft 9 during the course from the top to the impact during the swing motion.

Figure 6:
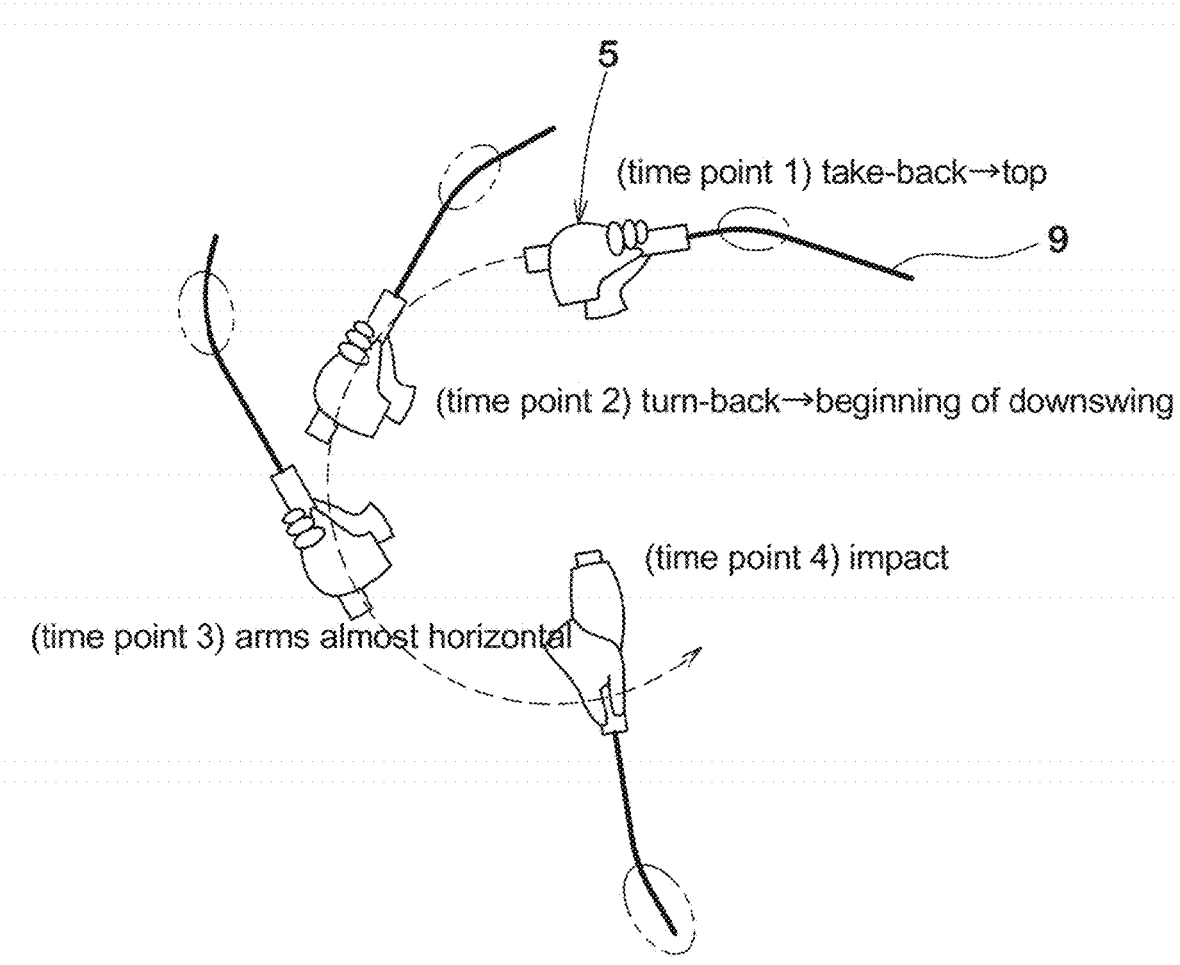
FIG. 6 is a diagram for explaining the flexural behavior of a shaft during swing.

FIG. 6 shows the golfer's hands and a portion of the shaft 9 from the take-back (top) to the impact during the course of the swing motion. In FIG. 6, portions of the shaft 9 where the bending is large are indicated by surrounding with imaginary lines.

In FIG. 6, at the time point 1 when the swing reaches the top, the shaft 9 is bent near the hands. When reaching the time point 2 at the beginning of the downswing from the turn-back, the bending moves slightly toward the tip end side of the shaft 9. Further, at the time point 3 when the golfer's arms are horizontal, the bending moves to the tip end side of the shaft 9 through its center position. Furthermore, at the time point 4 just before impact, the bending moves to near the tip end of the shaft 9.

Considering the change in the bending position of the shaft 9 during the suing motion as described above, in the present embodiment, as a feature of the swing motion, attention is paid to the angular velocity ωy in the direction of the coking of wrists during the downswing from the vicinity of the top to the impact. Specifically, the attention is paid to the angular velocity ωy at several points in time as the swing motion progresses. Here, "near the top" of the swing means a time period including a predetermined time immediately before the top and a predetermined time immediately after the top, for example, a time period of 100 ms from top −50 ms to top +50 ms.

Figure 7:
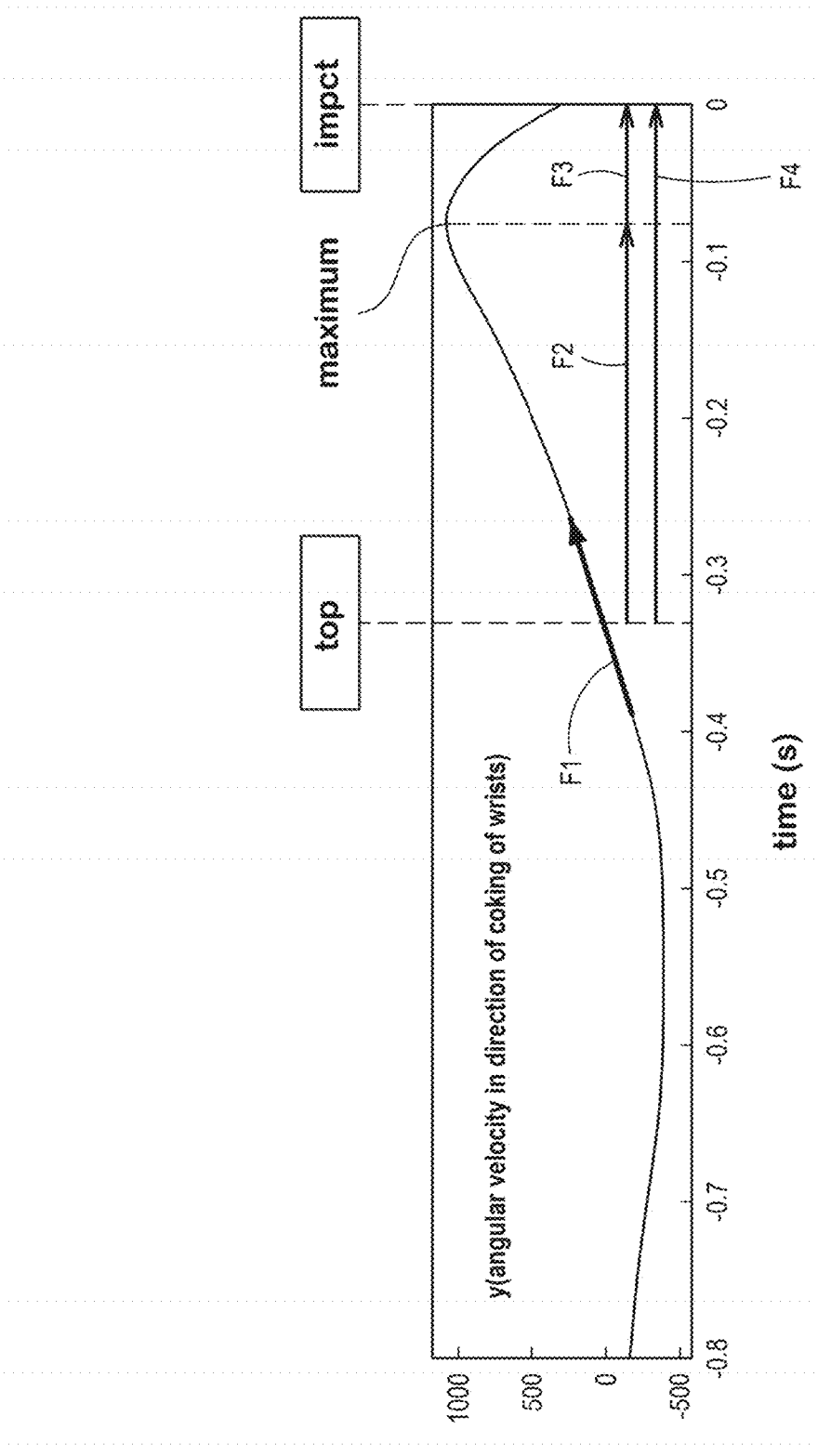
FIG. 7 is a graph showing the relationship between the passage of time in the swing and the angular velocity in the direction of coking of wrists.

FIG. 7 shows the relationship between the time (s) from the address to the impact of a given swing motion, and the angular velocity ωy (deg/s) of the first golf club 6 in the direction of the coking of wrists during the swing motion. In the present embodiment, as shown in FIG. 7, the following four swing feature quantities F1 to F4 are defined as swing feature quantities.

The swing feature quantities F1 are the inclination of the angular velocity ow in the direction of the coking of wrists near the top. For example, when the angular velocity ωy 50 ms before the top is expressed as the angular velocity ωy[before], and the angular velocity ωy 50 ms after the top is expressed as the angular velocity ωy[after], this swing feature quantities F1 can be calculated by −ωy [before]+ωy [after].

The swing feature quantities F2 is the average value of the angular velocity ωy from the time point at the top to the time point when the angular velocity ωy reaches its maximum. The swing feature quantities F2 is obtained by obtaining the maximum value of the angular velocity ωy from the top to the impact, calculating a cumulative value of the angular velocity ωy from the time point at the top to the time point when this maximum value is reached, and dividing the cumulative value by the time period from the time point at the top to the time point when this maximum value is reached.

The swing feature quantities F3 is the average value of the angular velocity ωy from the time point when the angular velocity ωy reaches its maximum to the time point at the impact. The swing feature quantities F3 can be calculated by obtaining a cumulative value of the angular velocity ωy from the time point when the angular velocity ωy reaches its maximum to the time point at the impact, and dividing the cumulative value by the time period from the time point when the angular velocity ωy reaches its maximum to the time point at the impact.

The swing feature quantities F4 is the average value of the angular velocity ωy from the top to the impact. The swing feature quantities F4 can be calculated by obtaining a cumulative value of the angular velocity ωy from the time point at the top to the time point at the impact, and dividing the cumulative value by the time period from the time point at the top to the time point at the impact.

In the present embodiment, when the swing motion is performed multiple times in the above-described step S1 of acquiring the measurement values, the average value of these swing motions may be calculated for each of the swing feature quantities F1 to F4. The swing feature quantities F1 to F4 (or second swing indices) are stored in the swing index input area 19e (shown in FIG. 2).

In the present embodiment, a case where, as the second swing index or indices, the index related to the angular velocity in the direction of the coking of wrists (y-axis direction) of the first golf club 6 during the swing motion is employed, is exemplified. But, the present embodiment is not limited to such case. For example, the second swing index or indices may be an index relating to the angular velocity about the x-axis direction (toe-heel direction) of the first golf club 6 during a swing motion, and/or an index relating to angular velocity about the i-axis direction (shaft axis direction).

[Determine Optimum Index (Determination Step)]

Next, in the fitting method of the present embodiment, based on the swing index or indices relating to the swing motion of the first golf club 6, a second optimum characteristic index is determined (determination step S6). In this determination step S6 in the present embodiment, in addition to the second optimum characteristic index, a first optimum stiffness index is determined.

The first optimum stiffness index indicates the distribution of flexural stiffness at a plurality of positions of the shaft 9 of the first golf club 6 which distribution is suitable for the golf 5. The second optimum characteristic index indicates the characteristic of the shaft for the second golf club.

In the determination step S6 in the present embodiment, first, the swing index (in this example, the first swing index and the second swing index) stored in the swing index input area 19e shown in FIG. 2 is read into the work memory 18. Further, a determination part 20f included in the program section 20 is read into the work memory 18. The determination part 2 of corresponds to a program for determining the second optimum characteristic index (in this example, inclusive of the first optimum stiffness index) based on the swing index. By executing the determination part 20f by the calculating part 16, the computer 12 can function as means for determining the second optimum characteristic index.

Figure 8:
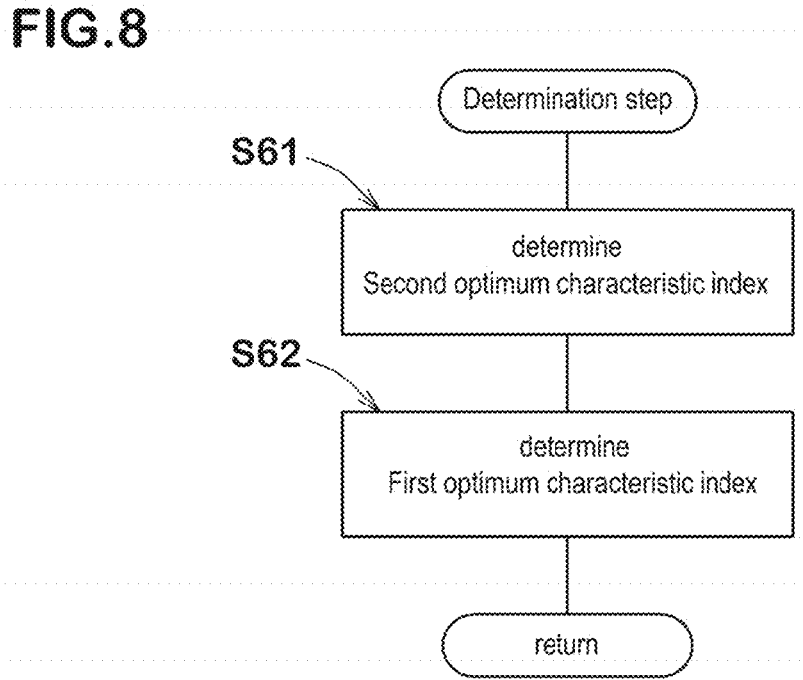
FIG. 8 is a flow chart showing a determination step of the fitting method.

FIG. 8 is a flow chart showing the processing procedure of the determination step S6 of the present embodiment.

[Determine Second Optimum Characteristic Index]

In the determination step S6 of the present embodiment, first, the second optimum characteristic index is determined (step S61). The second optimum characteristic index is not particularly limited as long as it indicates the characteristics of the shaft for the second golf club. The second optimum characteristic index in the present embodiment includes the weight of the shaft for the second golf club or an optimum range of the weight. Such second optimum characteristic index is determined based on the magnitude of the first swing index.

In the step S61 in the present embodiment, based on the average arm output power P1_ave and the average club input power P2_ave calculated as the first swing index, the weight of the shaft for the second golf club or its optimum range (second optimum characteristic index) is determined. Such weight or optimum weight range of the shaft can be determined as appropriate, and may be determined, for example, based on the calculation result of the optimum swing MI. In the present embodiment, the weight or weight range of the shaft for the second golf club is determined based on a divided region of a space showing the relationship between the average arm output power P1_ave and the average club input power P2_ave.

Figure 9:
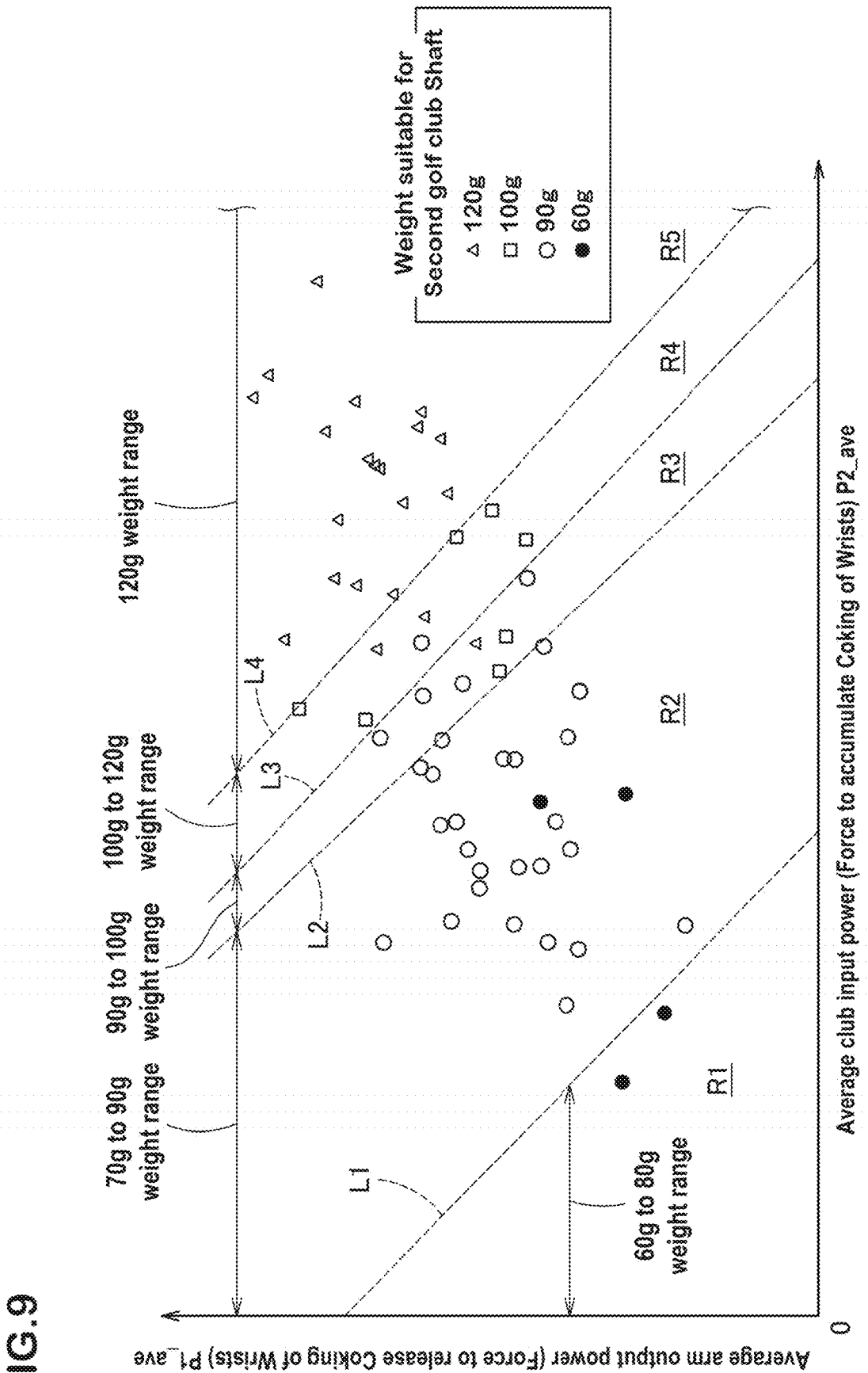
FIG. 9 is a map for determining the weight of the shaft for the second golf club.

FIG. 9 is a map for determining the weight of the shaft for the second golf club. As shown in FIG. 9, in the space showing the relationship between the average arm output power (force to release the coking of wrists) P1_ave and the average club input power (force to accumulate the coking of wrists) P2_ave, regions R1 to R5 corresponding to the weight ranges of the shaft for the second golf club are partitioned. It is preferable that, prior to execution of the fitting method, this map is stored in the data input area 19h (shown in FIG. 2), and read into the working memory 18 (shown in FIG. 2).

In FIG. 9, the space is partitioned into five regions R1 to R5 by four boundary lines L1 to L4.

The region R1 indicates a weight range of shaft from 60 to 80 grams.

The region R2 indicates a weight range of shaft from 70 to 90 grams.

The region R3 indicates a weight range of shaft from 90 to 100 grams.

The region R4 indicates a weight range of shaft from 100 to 120 grams.

The region R5 indicates a weight range of shaft of 120 grams.

In the step S61 in the present embodiment, the weight range of the shaft for the second golf club is determined as one of the regions R1 to R5 to which the average arm output power P1_ave and the average club input power P2_ave calculated as the first swing index belong.

The boundary lines L1 to L4 (regions R1 to R5) can be determined as appropriate. As a result of extensive research, the inventors have found that there is a correlation between the first swing index (average arm output power P1_ave and average club input power P2_ave) of the first golf club 6, and the weight range (second optimum characteristic index) of the shaft for the second golf club. Based on such finding, the boundary lines L1 to L4 (regions R1 to R5) can be defined, for example, according to the following procedure.

In the present embodiment, first, measurement values of swing motions of the first golf club 6 (for example, SRIXON (registered trademark) Z-745, #1 wood) by a plurality of golfers are obtained. Then, the first swing index (average arm output power P1_ave and average club input power P2_ave) is calculated. Next, attaching golf club shafts having various weights to a golf club head (for example, SRIXONR ZX5. #7 iron) as various second golf clubs, the plurality of golfers make trial shots. Then, for each golfer, the weight of the shaft at which the trajectory of the golf ball hit on trial is most stable, is determined as the optimum weight of the shaft for the second golf club. Then, for each golfer, based on the first swing index of the first golf club 6 and the optimum weight of the shaft for the second golf club, the boundary lines L1 to L4 (regions R1 to R5) can be specified.

Further, the inventors measured swing motions of the first golf club 6 for 61 testers different from the above-mentioned plurality of golfers, and confirmed the accuracy of the map in FIG. 9. In the present embodiment, by the 61 testers, second golf clubs having shafts of various weights were tried. Then, for each tester, the weight of the shaft at which the trajectory of the golf ball hit on trial was most stable was determined as the optimum weight of the shaft for the second golf club. Further, measurement values of swing motions of the first golf club 6 by the 61 testers were obtained, and the first swing indices (P1_ave and P2_ave) were obtained.

In FIG. 9, the shapes of the plots are different for each optimum weight determined by the trial hitting. As a result of such experiment, for 57 out of the 61 testers, the determined optimum weights respectively belonged to the regions R1 to R5 corresponding to the determined optimum weights. That is, it was confirmed that, by the map of FIG. 9, it is possible determine the optimum weight range of the shaft for the second golf club with a high accuracy rate of approximately 93% (57/61*100).

In the step S61 in the present embodiment, based on the map shown in FIG. 9, the second optimum characteristic index (weight range of the shaft for the second golf club) is determined with high accuracy, from the average arm output power P1_ave and the average club input power P2_ave calculated as the first swing index. The determined second optimum characteristic index is stored in the optimum characteristic index input area 19f (shown in FIG. 2).

[Determine First Optimum Stiffness Index]

Next, in the determination step S6 in the present embodiment, the first optimum stiffness index is determined (step S62). The first optimum stiffness index is not particularly limited as long as it indicates the flexural stiffness distribution at the plurality of positions of the shaft 9 of the first golf club 6 which distribution is suitable for the golf 5 shown in FIG. 1. In the present embodiment, as the first optimum stiffness index, IFC (International Flex Code) is used. The IFC is an index for specifying the range of EI values (ideal flexural stiffness values) at each of positions in the axial direction of the shaft 9 of the first golf club 6.

The IFC is an index indicating characteristics of a shaft that has been proposed by a company which was under the control of the present applicant and now merged with the present applicant and widely known in the golf club art.

The first optimum stiffness index (IFC) is determined based on the second swing index (swing feature quantities F1 to F4). By performing regression analysis on the results of a large number of impact tests, the relationship between the swing feature quantities F1 to F4 and the EI value in the axial direction of the shaft 9 suitable therefor can be determined in advance.

Figure 10:
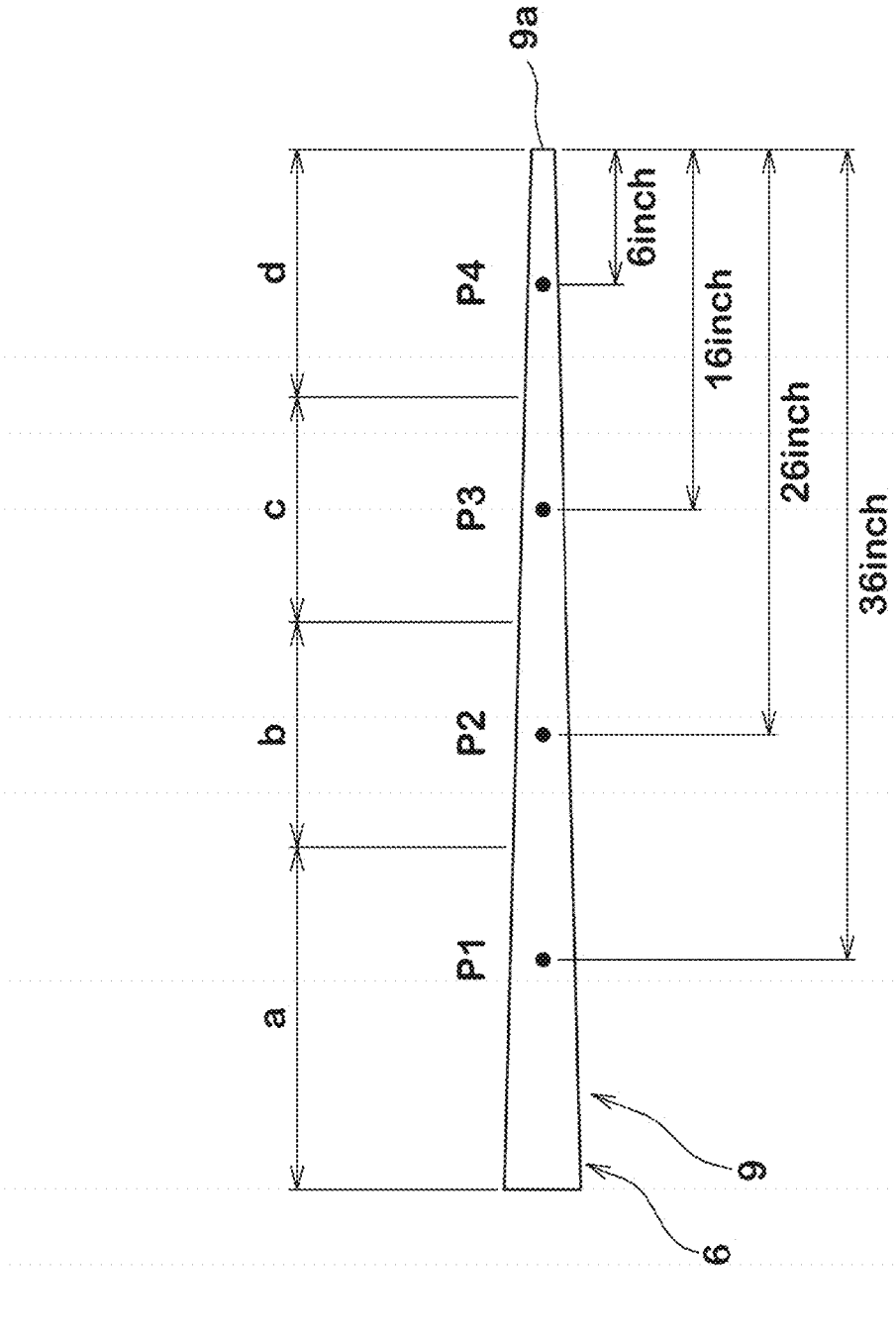
FIG. 10 is a plan view of the shaft of the first golf club.

FIG. 10 is a plan view of the shaft 9 of the first golf club 6. As shown in FIG. 10, the distribution of EI values of the shaft 9 in the axial direction is defined by representative EI values of respective regions "a" to "d" when the shaft 9 is virtually divided into the four regions "a" to "d". Specifically, the EI values of regions "a" to "d" are measured at positions P1 to P4, which are, respectively, 36 inches, 26 inches, 16 inches and 6 inches axially apart from the tip end 9a (on the club head side) of shaft 9. The EI values at each position P1 to P4 are correlated with the swing feature quantities F1 to F4. Note that the positions P1 to P4 as the measurement points, are not limited to the above-described positions, and may be changed by about +/−2 inches with respect to the above positions, for example.

Figure 11:
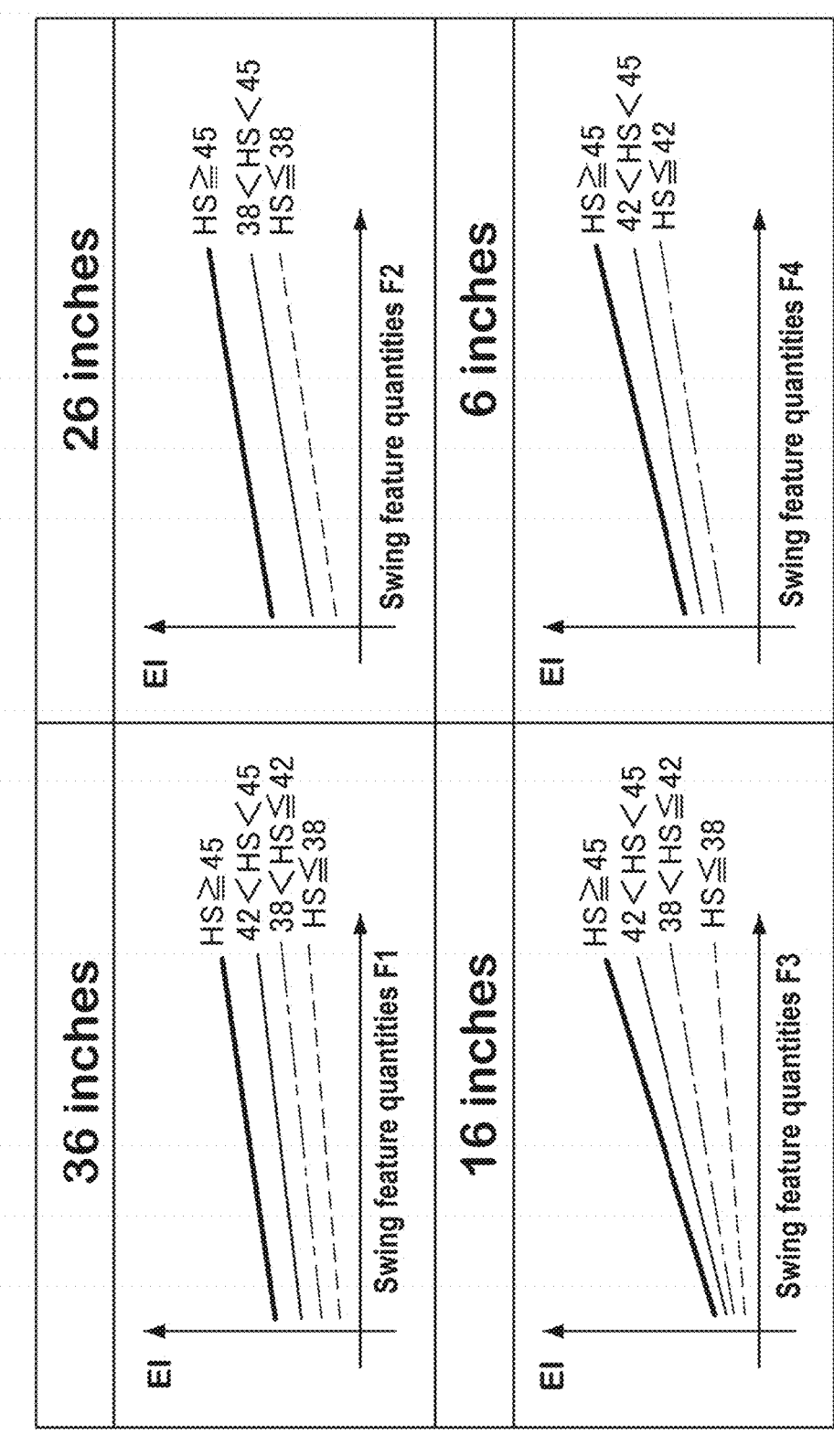
FIG. 11 shows graphs each showing a relationship between a swing feature quantity and an EI value at positions in the axial direction of the shaft suitable therefor.

FIG. 11 shows graphs each showing a relationship between the swing feature quantities F1 to F4, and the EI values of the shaft 9 suitable therefor at the respective positions P1 to P4 in the axial direction. These graphs have been obtained by, for example, regression analysis prior to execution of the fitting method, and stored in the data input area 19h (shown in FIG. 2).

In general, there is a relationship that as the swing feature quantities F1 to F4 increase, the EI values suitable for them at the respective positions P1 to P4 also increase (the shaft becomes stiffer). Note that "HS" in FIG. 11 is the head speed. The relationship between the swing feature quantities F1 to F4 and the EI value is determined for each head speed HS. The head speed by the golfer 5 to be fitted is measured in advance.

In the step S62 in the present embodiment, first, based on the second swing index (swing feature quantities F1 to F4), there are determined the EI values suitable therefor at each position P1 to P4 in the axial direction of the shaft 9.

Figure 12:
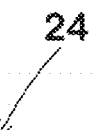
FIG. 12 shows EI value-IFC conversion tables.

Next, in the step S62 in the present embodiment, based on the determined EI values as above, the IFC (an index for specifying the range of the EI value at each position P1 to P4 in the axial direction of the shaft 9 shown in FIG. 10) is determined. In order to convert from EI values to IFC values, an EI value-IFC conversion table is used. FIG. 12 show an example of the EI value-IFC conversion table 24.

The EI values at the positions P1 to P4 of the shaft 9 of the first golf club 6 are converted to IFC values (integers from 0 to 9) by the EI value-IFC conversion table 24. Thus, based on a four-digit number (for example, "5535" etc.) obtained by arranging the four IFC values in the respective regions "a" to "d" in order, the first optimum stiffness index (IFC) a which can identify the shaft 9 having a flexural stiffness distribution at the plurality of positions of the shaft 9 is determined. The determined first optimum stiffness index is stored in the optimum characteristic index input area 19f (shown in FIG. 2).

[Selecting Shaft for Second Golf Club (Selection Step)]

Next, in the fitting method of the present embodiment, at least a shaft for the second golf club which matches the second optimum characteristic index is selected (selection step S7).

In the selection step S7 in the present embodiment, from among shafts for the second golf club selected as matching the second optimum characteristic index (weight range of the shaft for the second golf club), a shaft close to the flexural stiffness distribution (first optimum stiffness index) is selected.

In the selection step S7 in the present embodiment, first, the first optimum stiffness index and the second optimum characteristic index which are stored in the optimum characteristic index input area 19*f* shown in FIG. 2, and specification data of a plurality of shafts stored in the shaft storage area 19*i*, are read into the work memory 18.

The specification data of the plurality of shafts include data about specifications relating to the weight. IFC (flexural stiffness distribution) and the like, of a plurality of types (for example, 50 to 150 types or more) of shafts (candidate shafts) which can be used in the second golf club.

Figure 13:
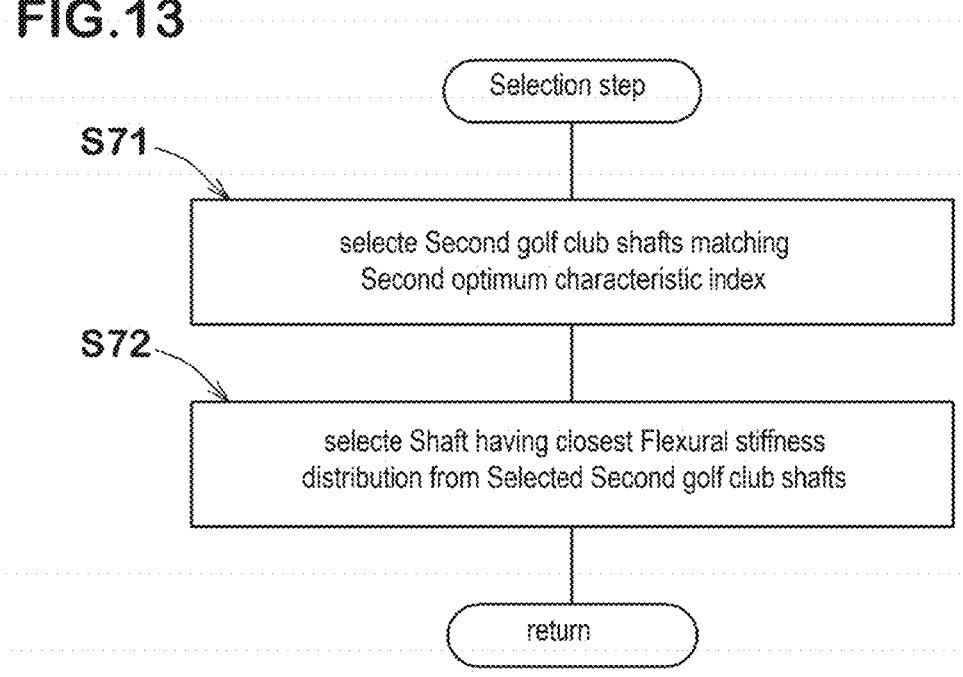
FIG. 13 is a flow chart showing a selection step of the fitting method.

Furthermore, in the selection step S7, the selection part 20*g* included in the program section 20 is read into the work memory 18. This selection part 20*g* corresponds to a program for selecting at least a shaft for the second golf club. By executing the selection part 20*g* by the calculating part 16, the computer 12 can function as means for selecting at least a shaft for the second golf club. FIG. 13 is a flow chart showing the processing procedure of the selection step S7 in the present embodiment.

[Select Shaft Matching Second Optimum Characteristic Index]

In the selection step S7 in the present embodiment, first, at least a shaft for the second golf club which matches the second optimum characteristic index is selected (step S71).

In the step S71 in the present embodiment, a shaft which matches the second optimum characteristic index (included in the weight range of the shaft for the second golf club) is selected (narrowed down) from among the plurality of types of shafts which can be used for the second golf club.

In the step S71 in the present embodiment, when at least one shaft matching the weight range is selected, the next step S72 is performed. On the other hand, if a shaft matching the weight range is not selected (does not exist), a message or the like is displayed by the output device 4 (shown in FIGS. 1 and 2) to notify that there is no shaft which matches the weight range, and a series of processing of the fitting method may be terminated.

[Select Shaft close to Flexural Stiffness Distribution]

Next, in the selection step S7 in the present embodiment, from among the shafts for the second golf club selected as matching the second optimum characteristic index, a shaft which is close to the flexural stiffness distribution (first optimum stiffness index) of the shaft 9 of the first golf club 6, is selected (step S72).

Figure 14A:
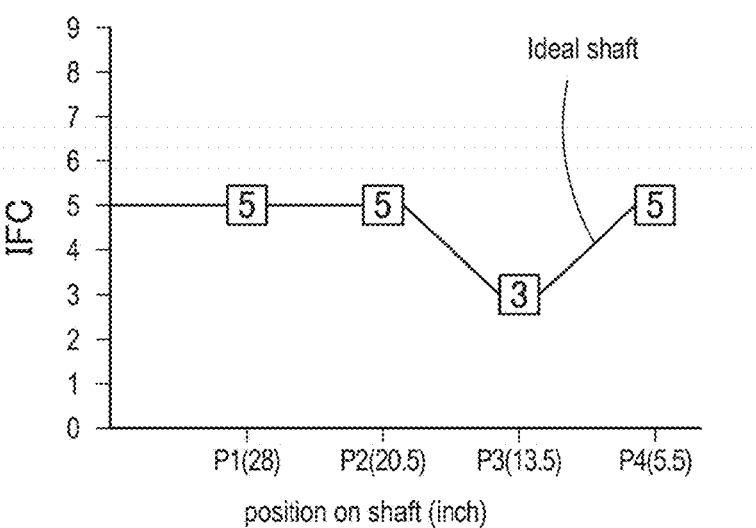
Figure 14B:
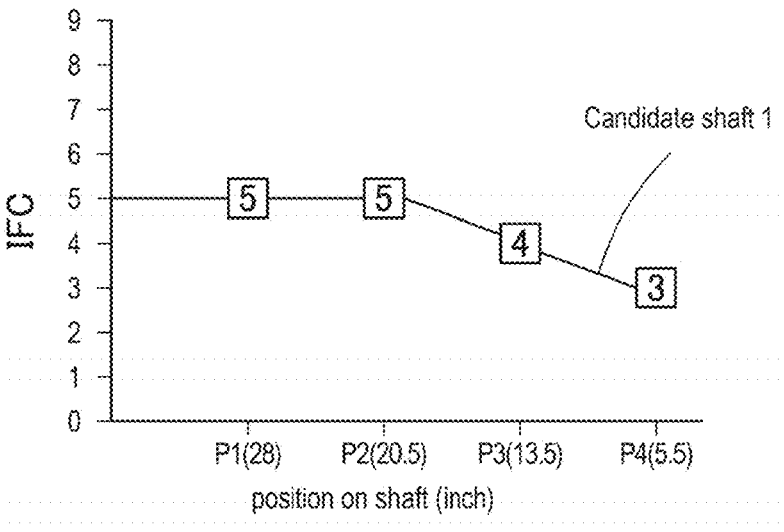
Figure 14C:
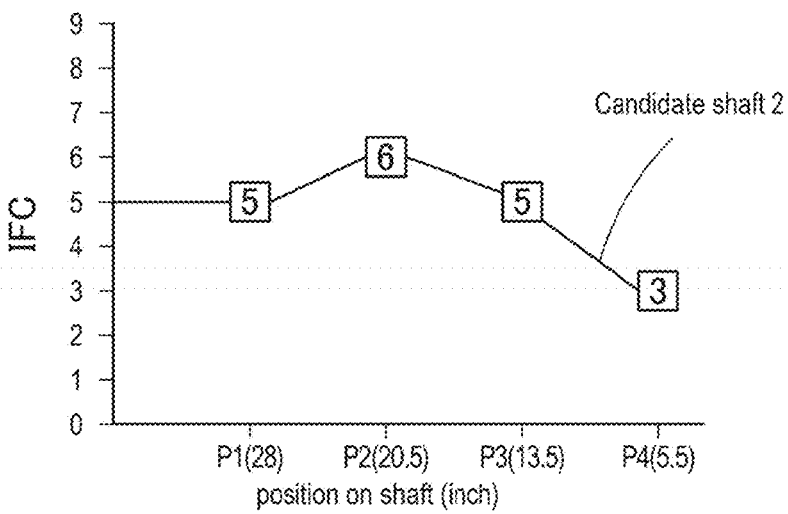

FIGS. 14A-14C show graphs (polygonal line graphs) showing the relationships between the axial positions of the shaft and the flexural stiffness (IFC). FIG. 14A shows the flexural stiffness distribution (first optimum stiffness index) of the shaft 9 of the first golf club 6 suitable for the golfer 5 (hereinafter sometimes simply referred to as the "ideal shaft" 9). In FIG. 14A, the inch in the axial direction from the tip end of each position P1-P4 of the shaft, is converted to the inch of each position P1-P4 of the shaft for the second golf club (namely, 28 inches, 20.5 inches, 13.5 inches and 5.5 inches). FIGS. 14B and 14C show examples of the flexural stiffness distribution of the shafts for the second golf club selected as matching the second optimum characteristic index. In FIGS. 14B and 14C, candidate shafts 1 and 2 having different flexural stiffness distributions are shown as representative examples.

In the step S72, the flexural stiffness distribution of the ideal shaft shown in FIG. 14A is compared with the flexural stiffness distributions of each of the plurality of candidate shafts (for example, 1 and 2 shown in FIGS. 14B and 14C). Then, a candidate shaft closest to the ideal shaft is selected from among the plurality of candidate shafts. As a result of extensive research by the inventors, it was found that the first golf club 6 and the second golf club share a flexural stiffness distribution which is ideal for the golfer 5, and the selection of a candidate shaft is based on such finding.

The flexural stiffness distributions can be compared as appropriate. In the present embodiment, the flexural stiffness distributions are compared based on the following equation (1):

$$F=F1+F2 \tag{1}$$

wherein $$F1=|A28-B28|+|A20.5-B20.5|+|A13.5-B13.5|$$

$$F2=|(A28-A20.5)-(B28-B20.5)|+|(A20.5-A13.5)-(B20.5-B13.5)|$$

A28 is IFC at ideal shaft's position P1
A20.5 is IFC at ideal shaft's position P2
A13.5 is IFC at ideal shaft's position P3
B28 is IFC at candidate shaft's position P1
B20.5 is IFC at candidate shaft's position P2
B13.5 is IFC at candidate shaft's position P3.

The value F1 in the above equation (1) indicates the difference in IFC between the ideal shaft and the candidate shaft at each position P1 to P3 in the axial direction of the shaft. The smaller this value F1 is, the closer the flexural stiffness of the ideal shaft is to the flexural stiffness of the candidate shaft.

The value F2 in the above equation (1) indicates a value obtained by subtracting the IFC difference of the candidate shaft (the slope of the straight line connecting the adjacent IFCs) from the IFC difference of the ideal shaft (the slope of the straight line connecting the adjacent IFCs), for the axially adjacent positions of the shaft. The smaller this value F2 is, the more similar the tendency of increase and decrease in the flexural stiffness of the shaft in the axial direction of the shaft are between the ideal shaft and the candidate shaft.

Then, the value F is obtained by adding these values F1 and F2. The smaller the value F, the more approximate, the distribution of the flexural stiffness of the ideal shaft (shown in FIG. 14A) is to the distribution of the flexural stiffness of the candidate shafts 1 and 2 (shown in FIGS. 14B and 14C). Note that, in the above equation (1), the IFC at the axial position P4 of the shaft is not considered. This is because the inventors have found that, in the second golf club, it is important to pay attention to the IFC at the positions P1, P2, and P3 on the golfer's hand side among the positions P1 to P4 in the axial direction of the shaft.

In the step S72 in the present embodiment, as described above, by using the above equation (1), it is possible to easily and reliably made the comparison between the flexural stiffness distribution of the ideal shaft and the flexural stiffness distribution of a plurality of candidate shafts.

In the step S72 in the present embodiment, from among the shafts for the second golf club selected as matching the second optimum characteristic index, there is selected a shaft having the smallest value F calculated by using the above equation (1).

The value F of the ideal shaft shown in FIG. 14A and the candidate shaft 1 shown in FIG. 14B is 2. The value F of the ideal shaft shown in FIG. 14A and the candidate shaft 2 shown in FIG. 14C is 5. Thus, in this case, the candidate shaft 1 with the smaller value F of 2 is selected. If there are a plurality of shafts having the same smallest value F, all of these shafts may be selected.

In the present embodiment, in order to compare the distribution of the flexural stiffness of the ideal shaft with the distribution of the flexural stiffness of a plurality of candidate shafts, the above equation (1) is used, but the present disclosure is not limited to this. For example, if the flexural stiffness (IFC) of the shaft 9 of the first golf club 6 and the flexural stiffness (IFC) of the shaft for the second golf club largely deviate from each other, then, instead of paying attention to those values, the comparison may be made by paying attention only to the shape of the change in the flexural stiffness distribution. In this way, when paying attention only to the shape of the change in the flexural stiffness distribution, for example, only the value F2 of the above equation (1) may be obtained. In any, case, the selected shaft is stored in the selected shaft input area 19g (shown in FIG. 2)

[Display Selected Shaft]

Next, in the fitting method of the present embodiment, the selected shaft for the second golf club is displayed (step S8). In the present embodiment, the shaft for the second golf club stored in the selected shaft input area 19g shown in FIG. 2, and the display part 20h included in the program section 20, are read into the working memory 18. The display part 20h corresponds to a program for displaying the selected shaft for the second golf club. By executing the display part 20h by the calculating part 16, the computer 12 can function as means for displaying the selected shaft for the second golf club.

Figure 15:
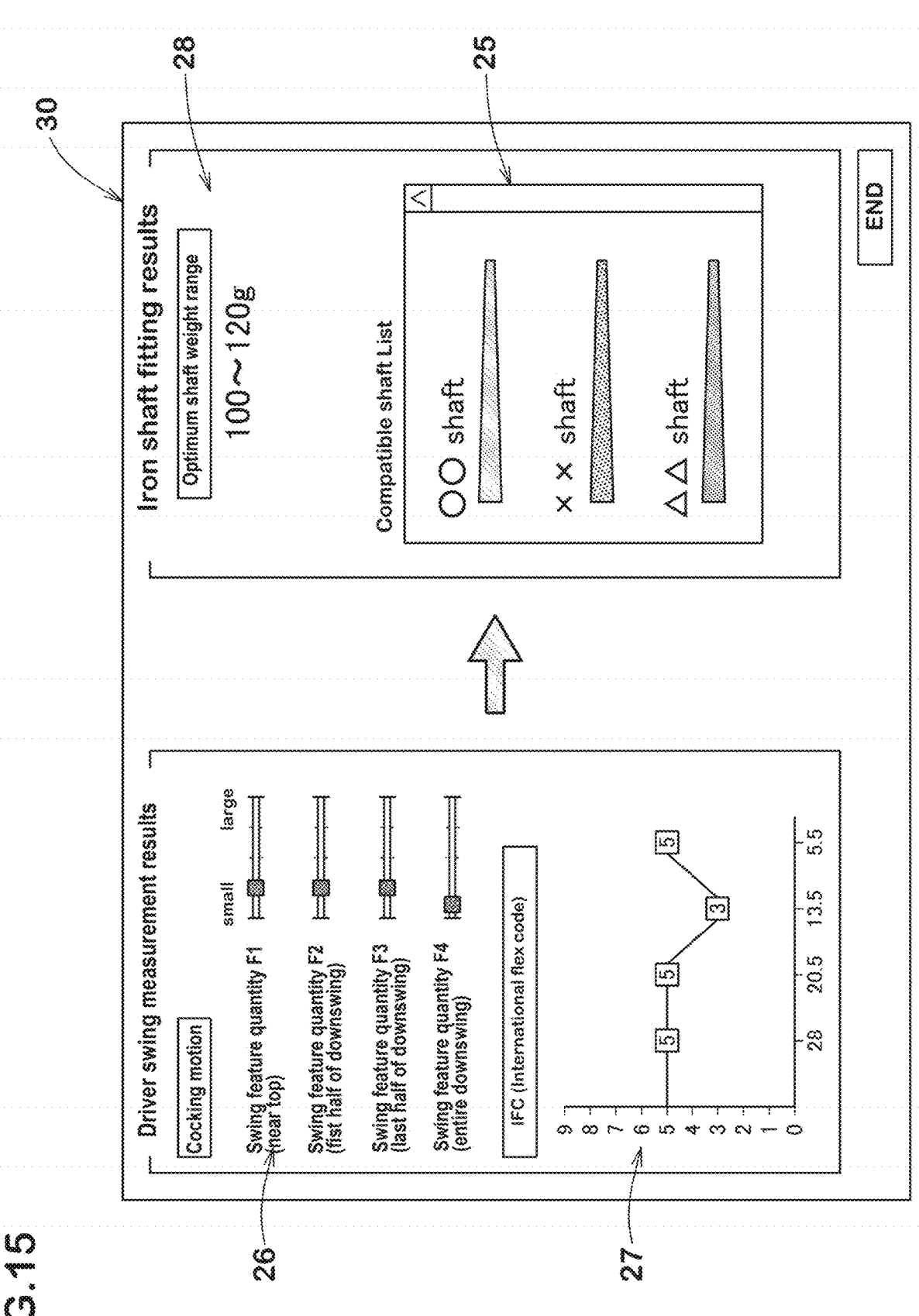
FIG. 15 shows an example of the fitting result displayed on the display device.

FIG. 15 is an example of the fitting result 30 displayed on the output device 4. In this example, the selected shafts for the second golf club are displayed in a compatible shaft list 25. Thus, in the present embodiment, it is possible to inform the golfer 5 (shown in FIG. 1) and the operator, of the shaft(s) for the second golf club being suitable for the golfer 5. Then, for example, the selected shaft is proposed to the golfer 5, and a trial shot is performed by using the second golf club with the selected shaft attached. Thus, it is possible to perform the fitting of the second golf club with a high degree of satisfaction for the golf 5.

On the output device 4, the following information may be displayed; the second swing index (swing feature quantities F1 to F4) of the first golf club 6 (information indicated by reference numeral "26"), the IFC of the shaft of the first golf club (information indicated by reference numeral "27"); and the second optimum characteristic index (weight range of the shaft for the second golf club) (information indicated by reference numeral "28"). The information 27 about the IFC may be converted to inches (28 inches, 20.5 inches, 13.5 inches and 5.5 inches) of the respective positions P1 to P4 of the shaft for the second golf club. Thereby, it is possible to inform the golfer 5 and the operator, of the circumstances leading up to the determination of the shaft for the second golf club suitable for the golfer 5.

In the fitting method (fitting device 3) of the present embodiment, by measuring the swing motion of a driver as the first golf club 6 shown in FIG. 4, a second golf club different from the driver can be fitted. Thus, the fitting method (fitting device 3) of the present embodiment does not require measurement of the swing motion of the second golf club. Therefore, using the measurement values of the swing motion measured when fitting the first golf club 6, the second golf club can be fitted, which improves the convenience.

Furthermore, in the present embodiment, from among the shafts for the second golf club selected as matching the second optimum characteristic index (shaft weight range), a shaft close to the flexural stiffness distribution (first optimum stiffness index) is selected (narrowed down). Thereby, it is possible to easily and reliably select a shaft most suitable for the golfer 5 (which can stabilize the trajectory most) from many shafts which can be attached to the second golf club.

[Fitting Method (Second Example)]

In the previous embodiment, among the shafts for the second golf club selected as matching the second optimum characteristic index (the weight range of the shaft), a shaft close to the flexural stiffness distribution (the first optimum stiffness index) is selected.

However, the present disclosure is not limited to this manner. For example, if the number of multiple types of shafts which can be used for the second golf club, is small in each weight range, then there is less need to narrow down the shafts for the second golf club by further considering the first optimum stiffness index. In this case, therefore, the following steps may be omitted: the step S52 of calculating the second swing index (shown in FIG. 5), the step S62 of determining the first optimum stiffness index (shown in FIG. 8), and the step S72 of selecting a shaft close to the flexural stiffness distribution (shown in FIG. 13). This makes it possible to simplify the selection of the shaft for the second golf club.

[Fitting Method (Third Example)]

In the fitting method of the previous embodiment, the second golf club is fitted separately. But, it is not limited to this. For example, the first golf club 6 may be fitted together with the second golf club.

Figure 16:
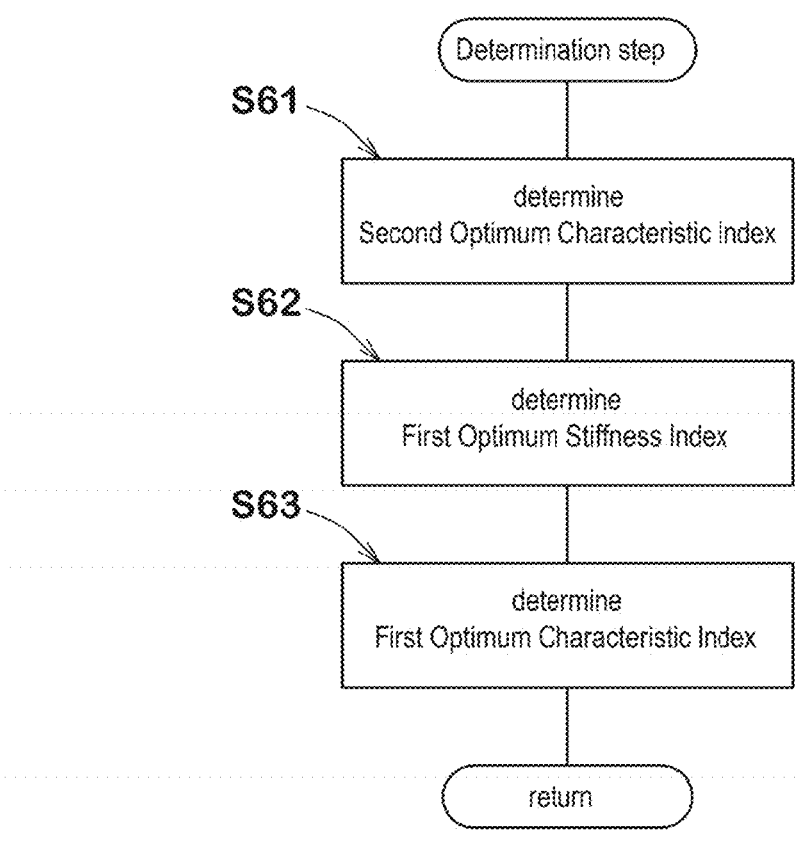
FIG. 16 is a flow chart showing another example of the determination step of the fitting method.

FIG. 16 is a flow chart showing the processing procedure of another example of the determination step S6 of the fitting method of the present disclosure. In this example, a first optimum characteristic index is further determined. The first optimum characteristic index indicates the characteristics of the shaft of the first golf club 6 suitable for the golfer 5 shown in FIG. 1.

[Determine First Optimum Characteristic Index]

In the determination step S6 in this example, the first optimum characteristic index is determined in step S63. The first optimum characteristic index is not particularly limited as long as it indicates the characteristics of the shaft 9 of the first golf club 6 suitable for the golfer 5 shown in FIG. 1. In this example, the first optimum characteristic index includes the weight of the shaft 9 of the first golf club 6 or an optimum range thereof.

In the step S63 in this example, first, based on the average arm output power P1_ave and the average club input power P2_ave calculated as the first swing index, the weight of the shaft for the first golf club, or its optimum weight range (first optimum characteristic index) is determined. Such weight or weight range of the shaft can be determined as appropriate, and may be determined, for example, based on the calculation result of the optimum swing MI as in Patent Document 1 above. In this example, based on the partitioned regions of the space showing the relationship between the average arm output power P1_ave and the average club input power P2_ave, the weight or optimum weight range of the shaft for the first golf club is determined.

Figure 17:
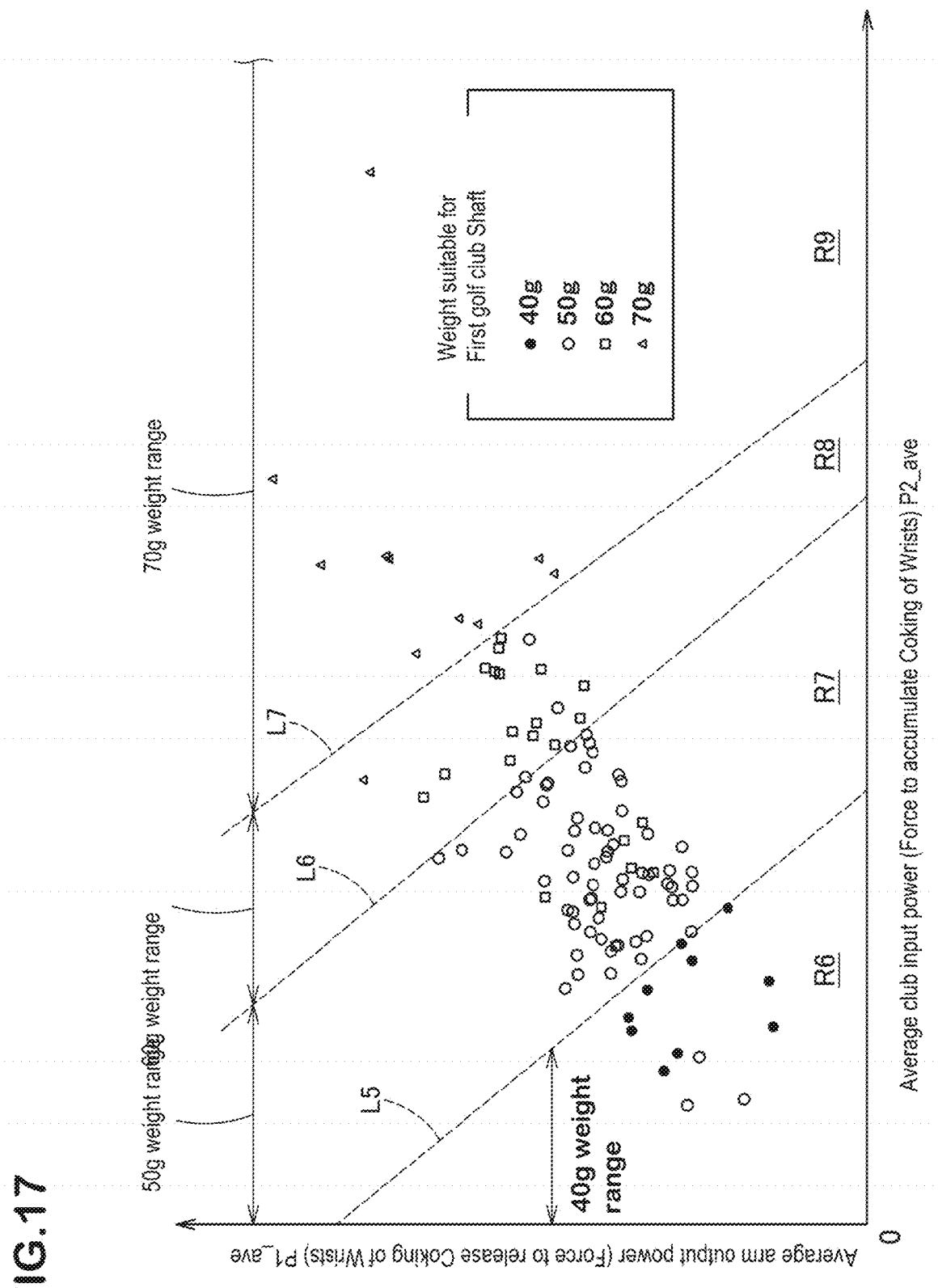
FIG. 17 is a map for determining the weight of the shaft of the first golf club.

FIG. 17 is a map for determining the weight of the shaft for the first golf club. As shown in FIG. 9 and FIG. 17, in the space showing the relationship between the average arm output power (force to release the coking of wrists) P1_ave and the average club input power (force to accumulate the coking of wrists) P2_ave, regions R6 to R9 corresponding to the weight ranges of the shafts for the first golf club, are partitioned. Preferably, prior to the execution of the fitting method, this map is stored, for example, in data input area 19h (shown in FIG. 20) and read into working memory 18 (shown in FIG. 2).

In FIG. 17, the four regions R6 to R9 are partitioned by three boundary lines L5 to L7. The region R6 indicates a weight range of 40 grams shafts. The region R7 indicates a weight range of 50 grams shafts. The region R8 indicates a weight range of 60 grams shafts. The region R9 indicates a weight range of 70 grams shafts.

In the step S63 in this example, the weight range of the shaft for the first golf club can be determined by determining which of the regions R6 to R9, the average arm output power P1_ave and the average club input power P2_ave calculated as the first swing index belong to.

The boundary lines L5 to L7 (regions R6 to R9) can be determined as appropriate. As a result of extensive research, the inventors have found that there is a correlation between the first swing index (average arm output power P1_ave and average club input power P2_ave) of the first golf club 6, and the weight range (first optimum characteristic index) of the shaft of the first golf club 6. Based on such finding, the boundary lines L5 to L7 (regions R6 to R9) can be specified, for example, according to the following procedure.

First, for a plurality of golfers, measurement values of swing motions of the first golf club 6 (for example, SRIXON (registered trademark) Z-745, #1 Wood) are obtained, and the first swing index (average arm output power P1_ave and average club input power P2_ave) is calculated. Next, shafts of various weights are attached to the first golf clubs, and the golfers make trial shots. Then, for each of the golfers, the weight of the shaft at which the trajectory of the golf ball hit on trial is most stable, is specified as the optimum weight of the shaft of the first golf club. Then, for each of the golfers, the boundary lines L5 to L7 (regions R6 to R9) can be specified based on the first swing index of the first golf club 6 and the optimum weight of the shaft of the first golf club.

The inventors measured swing motions of the first golf club 6 by 107 testers different from the above golfers, and confirmed the accuracy of the map shown in FIG. 17. In this example, shafts of various weights were attached to the first golf clubs, and these golf clubs were tried by the 107 testers. Then, for each of the 107 testers, the weight of the shaft at which the trajectory of the golf ball hit on trial is most stable, was specified as the optimum weight of the shaft of the first golf club. Further, measurement values of the swing motions of the first golf club 6 were obtained from the 107 testers, and the first swing index (P1_ave and P2_ave) was obtained.

In FIG. 17, the shapes of the plots are different for each optimum weight specified by the trial hitting. As a result of the experiment, for 89 out of 107 testers, the identified optimum weights belonged to the weight range regions R6 to R9 corresponding to the optimum weights. Namely, it was confirmed that the map shown in FIG. 17 can determine the optimum weight range for the shaft of the first golf club with a high accuracy rate of approximately 83% (89/107*100).

In the step S63 in this example, based on the map shown in FIG. 17, the first optimum characteristic index (the weight range of the shaft of the first golf club) is determined with high accuracy. The determined first optimum characteristic index is stored in the optimum characteristic index input area 19f (shown in FIG. 2).

[Selection Step (Second Example)]

In a second example of the selection step S7 of the fitting method in the present embodiment, at least a shaft for the second golf club which meets the second optimum characteristic index is selected, and further, at least a shaft 9 for the first golf club 6 which meets the first optimum characteristic index is selected.

Figure 18:
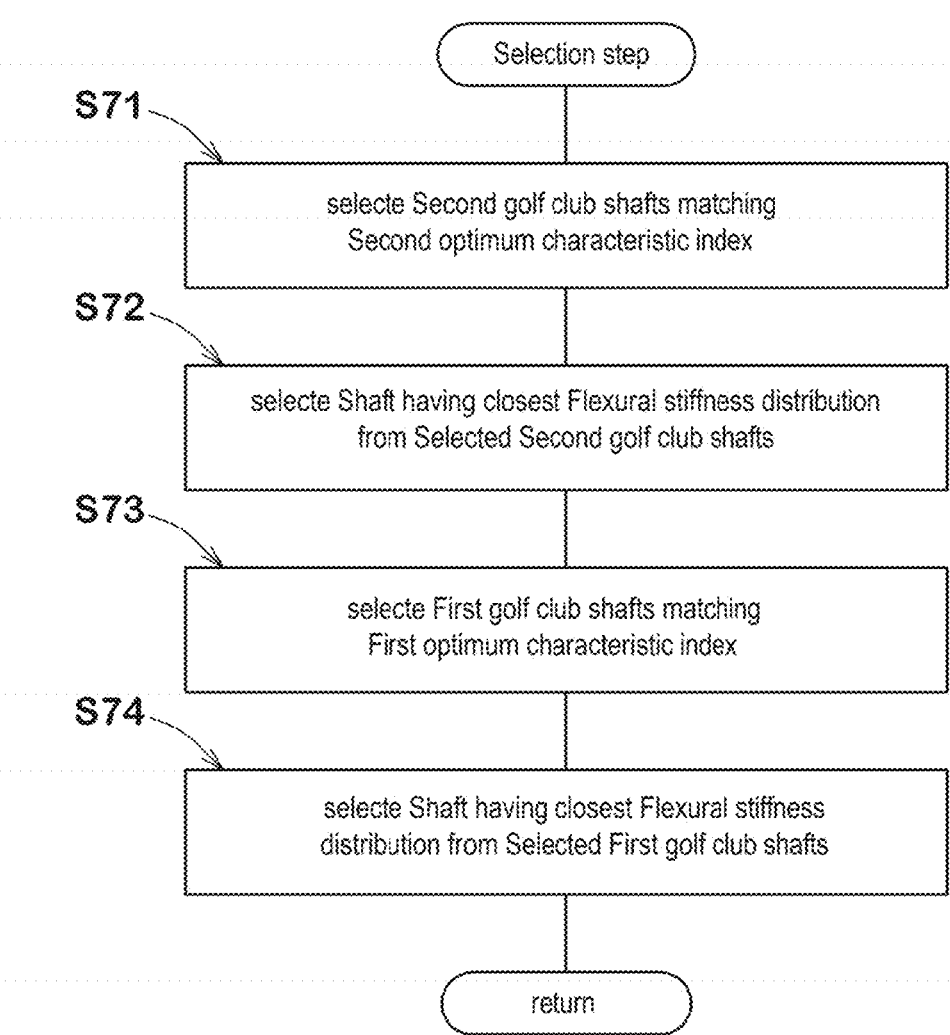
FIG. 18 is a flow chart showing another example of the selection step of the fitting method.

FIG. 18 is a flow chart showing the processing procedure of another example of the selection step S7 of the fitting method in the present embodiment. In the second example of the selection step S7, from among shafts 9 for the first golf club 6 selected as matching the first optimum characteristic index (the weight range of the shaft 9 of the first golf club 6), a shaft close to the flexural stiffness distribution (first optimum stiffness index) is selected. In this example, the spec data of a plurality of shafts includes data on specs including weight and IFC of a plurality of types (for example, 100 or more ty pes) of shafts which can be used in the first golf club 6

[Select Shaft Matching First Optimum Characteristic Index]

In the selection step S7 in this example, at least a shaft 9 for the first golf club 6 matching the first optimum characteristic index is selected (step S73). In the step S73, from among the plurality of types of shafts 9 which can be used for the first golf club 6, a shaft 9 which matches the first optimum characteristic index (is included in the weight range of the shaft 9 of the first golf club 6) is selected.

In the step S73, when at least one shaft matching the weight range is selected, the next step S74 is performed. If a shaft matching the weight range is not selected (does not exist), a message or the like may be displayed on the output device 4 to inform that there is no shaft which matches any weight ranges.

[Select Shaft Close to Flexural Stiffness Distribution]

Next, in the selection step S7 in this example, from among the shafts (candidate shafts) 9 for the first golf club 6 selected as matching the first optimum characteristic index, a shaft close to the flexural stiffness distribution (first optimum stiffness index) is selected (Step S74).

In this example, the flexural stiffness distribution of the ideal shaft determined as the first optimum stiffness index is compared with the flexural stiffness distributions of a plurality of candidate shafts. Then, from among the plurality of candidate shafts, a candidate shaft closest to the flexural stiffness distribution of the ideal shaft is selected.

The flexural stiffness distribution can be compared as appropriate. For example, the candidate shaft with the smallest difference in IFC from the ideal shaft at each position P1 to P4 in the axial direction of the shaft may be selected, or the shaft having the smallest F value calculated by the following equation (2) may be selected:

$$F = F1 + F2 \tag{2}$$

wherein $$F1 = |A36 - B36| + |A26 - B26| + |A16 - B16| + |A6 - B6|$$

$$F2 = |(A36 - A26) - (B36 - B26)| 1 (A26 - A16) - (B26 - B16)| + (A16 - A6) - (B16 - B6)|$$

A36: IFC at ideal shaft's position P1
A26: IFC at ideal shaft's position P2
A16: IFC at ideal shaft's position P3
A6: IFC at ideal shaft's position P4

B36: IFC at candidate shaft's position P1

B26: IFC at candidate shaft's position P2

B16: IFC at candidate shafts position P3

B6: IFC at candidate shaft's position P4.

In the equation (2), unlike the equation (1), the IFC at the axial position P4 of the shaft is taken into account. This is because the inventors have found that it is important for the first golf club to pas attention to all the IFCs at the positions P1 to P4 in the axial direction of the shaft for the first golf club. Thus, it is possible to easily and reliably compare the flexural stiffness distribution of the ideal shaft with the flexural stiffness distributions of a plurality of candidate shafts. The selected shaft is stored in the selected shaft input area 19g (shown in FIG. 2).

[Display Selected Shaft]

In the step S8 in the fitting method in the present embodiment, the selected shaft for the second golf club and the selected shaft 9 for the first golf club 6 are displayed. In this example, the selected shaft for the second golf club and the selected shaft 9 for the first golf club 6 are displayed in the compatible shaft list 25 as the fitting result 30 shown in FIG. 15.

It is preferable that the compatible shaft list 25 is displayed by distinguishing between the shaft 9 for the first golf club 6 and the shaft for the second golf club. Further, the first optimum characteristic index (weight range of the shall of the first golf club) (not shown) may be displayed. Thus, in the present embodiment, the selected shaft is proposed to the golfer 5, then, using the first golf club to which the selected shaft is attached, a trial shot is performed by the golfer 5. This enables fitting of the first golf club 6 and also the second golf club with high satisfaction for the golf 5.

In the fitting method (fitting device 3) of the present embodiment, by measuring the swing motion of the first golf club 6 (a driver), both the second golf club and the first golf club 6 can be fitted at the same time. Therefore, in the fitting method of the present embodiment, the measurement of the swing motion of the second golf club is not required, which improves convenience.

While detailed description has been made of preferable embodiments of the present disclosure, the present disclosure can be embodied in various forms without being limited to the above specific embodiments.

Example and Comparison Tests

More specific and non-limiting examples of the present disclosure will be described below. A golf club suitable for a golfer was selected using the fitting device shown in FIGS. 1 and 2 (Example). In this example, first, for a golfer desirous of fitting, measurement values was obtained by measuring the swing motion of a driver as the first golf club with a measuring device.

Next, based on the measurement values, the swing index regarding the swing motion was calculated. In this example, based on the processing procedure shown in FIG. 5, the first swing index and the second swing index were calculated. As the first swing index, the average arm output power (force to release the coking of wrists) P1_ave, the average club input power (force to accumulate the coking of wrists) P2_ave, and the head speed Vh were calculated. As the second swing index, the swing feature quantities F1 to F4 were calculated.

Next, based on the processing procedure shown in FIG. 8, from the first swing index, the second optimum characteristic index (weight range of the shaft for a second golf club) indicating characteristics of the shaft for the second golf club different from the driver, was determined. Further, based on the second swing index, the first optimum stiffness index indicating the flexural stiffness distribution of the shaft of the first golf club at a plurality of positions, was determined.

Next, based on the processing procedure shown in FIG. 13, from among the shafts which can be attached to the second golf club, at least a shaft for the second golf club matching the second optimum characteristic index (weight range) was selected. Further, from among the shafts for the second golf club selected as matching the second optimum characteristic index, a shaft close to the flexural stiffness distribution was selected. Then, the selected shaft was attached to the second golf club, and the trajectories when the golfer holding the second golf club made trial shots (hit five balls in total) were measured.

For comparison, a shaft (comparative example) having a different weight range and flexural stiffness than the shaft selected in the example, was selected. Then, the selected shaft was attached to the second golf club, and the trajectories when the golfer holding the second golf club made trial shots (hit five balls in total) were was measured. The specifications of the shafts of Example and Comparative Example were as follows.

Example Shaft:

Weight: 120 grams

Flexural stiffness (IFC): 6777

Comparative Example:

Weight: 60 grams

Flexural stiffness (IFC): 3333

FIGS. 19A and 19B show the hitting results of a #7 iron golf club having a shaft of a comparative example, wherein FIG. 19A is a graph showing the lateral deviation of the trajectory, and FIG. 19B is a graph showing the height of the trajectory. FIGS. 20A and 20B show the hitting results of a #7 iron golf club having a shaft of the example, wherein FIG. 20A is a graph showing the lateral deviation of the trajectory, and FIG. 20B is a graph showing the height of the trajectory.

As a result of the test, the second golf club having the shaft selected as the example showed a golf ball trajectory more stable than the second golf club having the shaft selected as the comparative example. Therefore, in the present embodiment, by measuring the swing motion of a driver, it was possible to fit a golf club different from the driver.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. Further, use of the term "part" may refer to a circuit or circuitry, as described herein.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware. Some or all of one or more methods as described herein may be implemented in or using circuitry.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the FIGURES illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments of the present disclosure may be as follows:

[Present Disclosure 1]

A fitting device for selecting a golf club suitable for a golfer, comprising:

an acquisition part obtaining measurement values by measuring a swing motion of a first golf club by the golfer with a measuring device;

a calculating part which, based on the measurement values, calculates a swing index related to the swing motion;

a determination part which based on the swing index, determines a second optimum characteristic index showing characteristics of a shaft for a second golf club different from the first golf club; and a selection part which selects at least a shaft for the second golf club matching the second optimum characteristic index.

[Present Disclosure 2]

The fitting device according to Present Disclosure 1, wherein the second golf club is an iron golf club.

[Present Disclosure 3]

The fitting device according to Present Disclosure 1 or 2, wherein the second optimum characteristic index includes the weight of the shaft for the second golf club or an optimum weight range thereof.

[Present Disclosure 4]

The fitting device according to Present Disclosure 3, wherein the swing index includes, as a first swing index, at least one of an index indicating power output by the arms of the golfer during the swing motion, an index indicating power input to the first golf club during the swing motion, an index indicating energy exerted by the golfer during the swing motion, and an index indicating torque exerted by the golfer during the swing motion; and the determination part determines the second optimum characteristic index based on the magnitude of the first swing index.

[Present Disclosure 5]

The fitting device according to Present Disclosure 4, wherein the calculating part further calculates a second swing index different from the first swing index, the determination part further determines, based on the second swing index, a first optimum stiffness index suitable for the golfer, which indicates a distribution of flexural stiffness at a plurality of positions of a shaft of the first golf club, and the selection part further selects a shaft having a distribution of flexural stiffness close to the distribution of flexural stiffness of the shaft of the first golf club from among shafts for the second golf club selected as matching the second optimum characteristic index.

[Present Disclosure 6]

The fitting device according to Present Disclosure 5, wherein the second swing index is an index relating to an angular velocity of the first golf club during the swing motion.

[Present Disclosure 7]

The fitting device according to Present Disclosure 5 or 6, wherein the determination part further determines, based on the first swing index, a first optimum characteristic index indicating characteristics of the shaft for the first golf club suitable for the golfer, and the selection part further selects at least a shaft for the first golf club matching the first optimum characteristic index.

[Present Disclosure 8]

The fitting device according to Present Disclosure 7, wherein the first optimum characteristic index includes the weight of the shaft for the first golf club or an optimum weight range thereof.

[Present Disclosure 9]

The fitting device according to Present Disclosure 8, wherein the selection part further selects, from among shafts for the first golf club selected as matching the first optimum characteristic index, a shaft close to the distribution of flexural stiffness.

[Present Disclosure 10]

A fitting system for selecting a golf club suitable for a golfer, comprising:

the fitting device according to Disclosure 1 or 2;

the measuring device for measuring the swing motion of the first golf club; and a display device for displaying the selected shaft for the second golf club.

[Present Disclosure 11]

A fitting method for selecting a golf club suitable for a golfer, comprising steps of:

obtaining measurement values by measuring a swing motion of a first golf club by the golfer with a measuring device;

calculating, based on the measurement values, a swing index related to the swing motion;

determining, based on the swing index, a second optimum characteristic index indicating characteristics of a shaft for a second golf club different from the first golf club; and selecting at least a shaft for the second golf club matching the second optimum characteristic index.

[Present Disclosure 12]

A computer program for selecting a golf club suitable for a golfer, allowing a computer to function as means for obtaining measurement values by measuring a swing motion of a first golf club by the golfer with a measuring device;

calculating, based on the measurement values, a swing index related to the swing motion;

determining, based on the swing index, a second optimum characteristic index indicating characteristics of a shaft for a second golf club different from the first golf club, and selecting at least a shaft for the second golf club matching the second optimum characteristic index.

[Present Disclosure 13]

The fitting device according to Present Disclosure 5, wherein for each of the shafts for the second golf club, the distribution of flexural stiffness of the shaft for the second golf club is compared with the distribution of flexural stiffness of the shaft of the first golf club based on the following equation (1):

$$F = F1 + F2 \qquad\qquad \text{eq. (1)}$$

wherein $$F1 = |A28 - B28| + |A20.5 - B20.5| + |(A13.5 - B13.5|$$

$$F2 = |(A28 - A20.5) - (B28 - B20.5)| + |(A20.5 - A13.5) - (B20.5 - B13.5)|$$

A28 is IFC number at a position P1 on the shaft of the first golf club,

A20.5 is IFC number at a position P2 on the shaft of the first golf club,

A13.5 is IFC number at a position P3 on the shaft of the first golf club.

B28 is IFC number at a position P1 on the shaft for the second golf club.

B20.5 is IFC number at a position P2 on the shaft for the second golf club, and

B13.5 is IFC number at a position P3 on the shaft for the second golf club, and the selection part selects a shaft or shafts for the second golf club having a smallest F value.

[Present Disclosure 14]

The fitting device according to Present Disclosure 9, wherein for each of the shafts for the first golf club selected as matching the first optimum characteristic index, the distribution of flexural stiffness of the shaft for the first golf club is compared with the distribution of flexural stiffness as the first optimum stiffness index suitable for the golfer based on the following equation (2):

$$F = F1 + F2 \qquad\qquad \text{eq. (2)}$$

wherein $$F1 = |A36 - B36| + |A26 - B26| + |A16 - B16| + |A6 - B6|$$

$$F2 = |(A36 - A26) - (B36 - B26)| + |(A26 - A16) - (B26 - B16)| + |(A16 - A6) - (B16 - B6)|$$

A36 is IFC number at a position P1 on the shaft having the first optimum stiffness index suitable for the golfer, A26 is IFC number at a position P2 on the shaft having the first optimum stiffness index suitable for the golfer.

A16 is IFC number at a position P3 on the shaft having the first optimum stiffness index suitable for the golfer, A6 is IFC number at a position P4 on the shaft having the first optimum stiffness index suitable for the golfer.

B36 is IFC number at a position P1 on the shaft for the first golf club,

B26 is IFC number at a position P2 on the shaft for the first golf club,

B16 is IFC number at a position P3 on the shaft for the first golf club, and

B6 is IFC number at a position P4 on the shaft for the first golf club, and the selection part selects a shaft or shafts for the first golf club having a smallest F value.

The invention claimed is:

1. A fitting device for selecting a golf club suitable for a golfer, comprising processing circuitry configured to:

obtain measurement values by measuring a swing motion of a first golf club by the golfer with a measuring device;

calculate, based on the measurement values, a first swing index related to the swing motion, wherein the first swing index includes at least one of an index indicating power output by the arms of the golfer during the swing motion, an index indicating power input to the first golf club during the swing motion, an index indicating energy exerted by the golfer during the swing motion, and an index indicating torque exerted by the golfer during the swing motion;

determine, based on a magnitude of the first swing index, a second optimum characteristic index showing characteristics of a shaft for a second golf club different from the first golf club, wherein the second optimum characteristic index includes the weight of the shaft for the second golf club or an optimum weight range thereof;

calculate a second swing index different from the first swing index;

determine, based on the second swing index, a first optimum stiffness index suitable for the golfer, wherein the first optimum stiffness index indicates a distribution of flexural stiffness at a plurality of positions of a shaft of the first golf club; and select, from among second candidate shafts for the second golf club selected as matching the second optimum characteristic index, a shaft for the second golf club having a distribution of flexural stiffness close to said distribution of flexural stiffness of the shaft of the first golf club, such that:

for each of the second candidate shafts for the second golf club, the distribution of flexural stiffness of the second candidate shaft is compared with said distribution of flexural stiffness of the shaft of the first golf club based on the following equation (1):

$$F = F1 + F2 \qquad (1), \text{ wherein}$$

$$F1 = |A28 - B28| + |A20.5 - B20.5| + |A13.5 - B13.5|$$

$$F2 = |(A28 - A20.5) - (B28 - B20.5)| + |(A20.5 - A13.5) - (B20.5 - B13.5)|$$

A28 is IFC number at a position P1 on the shaft of the first golf club,

A20.5 is IFC number at a position P2 on the shaft of the first golf club,

A13.5 is IFC number at a position P3 on the shaft of the first golf club,

B28 is IFC number at a position P1 on the shaft for the second golf club,

B20.5 is IFC number at a position P2 on the shaft for the second golf club, and

B13.5 is IFC number at a position P3 on the shaft for the second golf club; and from among the second candidate shafts, a shaft or shafts having a smallest F value are selected for the second golf club.

2. The fitting device according to claim 1, wherein the second golf club is an iron golf club.

3. The fitting device according to claim 2, wherein the second optimum characteristic index includes the weight of the shaft for the second golf club or an optimum weight range thereof.

4. The fitting device according to claim 1, wherein the second swing index is an index relating to an angular velocity of the first golf club during the swing motion.

5. The fitting device according to claim 1, wherein the processing circuitry is further configured to determine, based on the first swing index, a first optimum characteristic index indicating characteristics of the shaft for the first golf club suitable for the golfer, and select at least a shaft for the first golf club matching the first optimum characteristic index.

6. The fitting device according to claim 5, wherein the first optimum characteristic index includes the weight of the shaft for the first golf club or an optimum weight range thereof.

7. The fitting device according to claim 6, wherein the processing circuitry is further configured to select, from among first candidate shafts for the first golf club selected as matching the first optimum characteristic index, a shaft having a distribution of flexural stiffness close to the distribution of flexural stiffness.

8. The fitting device according to claim 1, further comprising:

the measuring device to measure the swing motion of the first golf club; and a display to display the selected shaft for the second golf club.

9. A fitting method for selecting a golf club suitable for a golfer, comprising:

obtaining measurement values by measuring a swing motion of a first golf club by the golfer with an electronic measuring device;

calculating, based on the measurement values, a first swing index related to the swing motion, wherein the first swing index includes at least one of an index indicating power output by the arms of the golfer during the swing motion, an index indicating power input to the first golf club during the swing motion, an index indicating energy exerted by the golfer during the swing motion, and an index indicating torque exerted by the golfer during the swing motion;

determining, based on a magnitude of the first swing index, a second optimum characteristic index indicating characteristics of a shaft for a second golf club different from the first golf club, wherein the second optimum characteristic index includes the weight of the shaft for the second golf club or an optimum weight range thereof;

calculating a second swing index different from the first swing index;

determining, based on the second swing index, a first optimum stiffness index suitable for the golfer, wherein the first optimum stiffness index indicates a distribution of flexural stiffness at a plurality of positions of a shaft of the first golf club; and selecting, from among second candidate shafts for the second golf club selected as matching the second optimum characteristic index, a shaft for the second golf club having a distribution of flexural stiffness close to said distribution of flexural stiffness of the shaft of the first golf club, such that:

for each of the second candidate shafts for the second golf club, the distribution of flexural stiffness of the second candidate shaft is compared with said distribution of flexural stiffness of the shaft of the first golf club based on the following equation (1);

$$F=F1+F2 \qquad \text{(1), wherein}$$

$$F1=|A28-B28|+|A20.5-B20.5|+|A13.5-B13.5|$$

$$F2=|(A28-A20.5)-(B28-B20.5)|+|(A20.5-A13.5)-(B20.5-B13.5)|$$

A28 is IFC number at a position P1 on the shaft of the first golf club,

A20.5 is IFC number at a position P2 on the shaft of the first golf club,

A13.5 is IFC number at a position P3 on the shaft of the first golf club,

B28 is IFC number at a position P1 on the shaft for the second golf club,

B20.5 is IFC number at a position P2 on the shaft for the second golf club, and

B13.5 is IFC number at a position P3 on the shaft for the second golf club; and from among the second candidate shafts, a shaft or shafts having a smallest F value are selected for the second golf club.

10. A non-transitory computer-readable storage medium having stored thereon instructions that, when executed by one or more processors, causes the one or more processors to perform a method comprising:

obtaining measurement values by measuring a swing motion of a first golf club by the golfer with an electronic measuring device;

calculating, based on the measurement values, a first swing index related to the swing motion, wherein the first swing index includes at least one of an index indicating power output by the arms of the golfer during the swing motion, an index indicating power input to the first golf club during the swing motion, an index indicating energy exerted by the golfer during the swing motion, and an index indicating torque exerted by the golfer during the swing motion;

determining, based on a magnitude of the first swing index, a second optimum characteristic index indicating characteristics of a shaft for a second golf club different from the first golf club, wherein the second optimum characteristic index includes the weight of the shaft for the second golf club or an optimum weight range thereof;

calculating a second swing index different from the first swing index;

determining, based on the second swing index, a first optimum stiffness index suitable for the golfer, wherein the first optimum stiffness index indicates a distribution of flexural stiffness at a plurality of positions of a shaft of the first golf club; and selecting, from among second candidate shafts for the second golf club selected as matching the second optimum characteristic index, a shaft for the second golf club having a distribution of flexural stiffness close to said distribution of flexural stiffness of the shaft of the first golf club, such that:

for each of the second candidate shafts for the second golf club, the distribution of flexural stiffness of the second candidate shaft is compared with said distribution of flexural stiffness of the shaft of the first golf club based on the following equation (1);

$$F=F1+F2 \qquad \text{(1), wherein}$$

$$F1=|A28-B28|+|A20.5-B20.5|+|A13.5-B13.5|$$

$$F2=|(A28-A20.5)-(B28-B20.5)|+|(A20.5-A13.5)-(B20.5-B13.5)|$$

A28 is IFC number at a position P1 on the shaft of the first golf club,

A20.5 is IFC number at a position P2 on the shaft of the first golf club,

A13.5 is IFC number at a position P3 on the shaft of the first golf club,

B28 is IFC number at a position P1 on the shaft for the second golf club,

B20.5 is IFC number at a position P2 on the shaft for the second golf club, and

B13.5 is IFC number at a position P3 on the shaft for the second golf club; and from among the second candidate shafts, a shaft or shafts having a smallest F value are selected for the second golf club.

11. A fitting device for selecting a golf club suitable for a golfer comprising processing circuitry configured to:

obtain measurement values by measuring a swing motion of a first golf club by the golfer with a measuring device;

calculate, based on the measurement values, a first swing index related to the swing motion, wherein the first swing index includes at least one of an index indicating power output by the arms of the golfer during the swing motion, an index indicating power input to the first golf club during the swing motion, an index indicating energy exerted by the golfer during the swing motion, and an index indicating torque exerted by the golfer during the swing motion;

determine, based on a magnitude of the first swing index, a second optimum characteristic index showing characteristics of a shaft for a second golf club different from the first golf club, wherein the second optimum characteristic index includes the weight of the shaft for the second golf club or an optimum weight range thereof;

select at least one shaft for the second golf club matching the second optimum characteristic index;

calculate a second swing index different from the first swing index;

determine, based on the second swing index, a first optimum stiffness index suitable for the golfer, wherein the first optimum stiffness index indicates a distribution of flexural stiffness at a plurality of positions of a shaft of the first golf club;

select, from among second candidate shafts for the second golf club selected as matching the second optimum characteristic index, a shaft having a distribution of flexural stiffness close to said distribution of flexural stiffness of the shaft of the first golf club;

determine, based on the first swing index, a first optimum characteristic index indicating characteristics of the shaft for the first golf club suitable for the golfer, wherein the first optimum characteristic index includes the weight of the shaft for the first golf club or an optimum weight range thereof; and select, from among first candidate shafts for the first golf club selected as matching the first optimum character-istic index, a shaft having a distribution of flexural stiffness close to said distribution of flexural stiffness of the shaft of the first golf club, such that:

for each of the first candidate shafts for the first golf club selected as matching the first optimum characteristic index, the distribution of flexural stiffness of the first candidate shaft for the first golf club is compared with the distribution of flexural stiffness as the first optimum stiffness index suitable for the golfer based on the following equation (2):

$$F=F1+F2 \qquad \text{(2), wherein}$$

$$F1=|A36-B36|+|A26-B26|+|A16-B16|+|A6-B6|$$

$$F2=|(A36-A26)-(B36-B26)|1(A26-A16)-(B26-B16)$$
$$|+(A16-A6)-(B16-B6)|$$

A36 is IFC number at a position P1 on the shaft having the first optimum stiffness index suitable for the golfer, A26 is IFC number at a position P2 on the shaft having the first optimum stiffness index suitable for the golfer, A16 is IFC number at a position P3 on the shaft having the first optimum stiffness index suitable for the golfer, A6 is IFC number at a position P4 on the shaft having the first optimum stiffness index suitable for the golfer, B36 is IFC number at a position P1 on the shaft for the first golf club, B26 is IFC number at a position P2 on the shaft for the first golf club, B16 is IFC number at a position P3 on the shaft for the first golf club, and B6 is IFC number at a position P4 on the shaft for the first golf club, club; and from among the first candidate shafts, a shaft or shafts having a smallest F value are selected for the first golf club.

12. The fitting device according to claim 11, wherein the second swing index is an index relating to an angular velocity of the first golf club during the swing motion.

13. A fitting method for selecting a golf club suitable for a golfer, comprising:

obtaining measurement values by measuring a swing motion of a first golf club by the golfer with a mea-suring device;

calculating, based on the measurement values, a first swing index related to the swing motion, wherein the first swing index includes at least one of an index indicating power output by the arms of the golfer during the swing motion, an index indicating power input to the first golf club during the swing motion, an index indicating energy exerted by the golfer during the swing motion, and an index indicating torque exerted by the golfer during the swing motion;

determining, based on a magnitude of the first swing index, a second optimum characteristic index showing characteristics of a shaft for a second golf club different from the first golf club, wherein the second optimum characteristic index includes the weight of the shaft for the second golf club or an optimum weight range thereof;

selecting at least one shaft for the second golf club matching the second optimum characteristic index;

calculating a second swing index different from the first swing index;

determining, based on the second swing index, a first optimum stiffness index suitable for the golfer, wherein the first optimum stiffness index indicates a distribution of flexural stiffness at a plurality of positions of a shaft of the first golf club;

selecting, from among second candidate shafts for the second golf club selected as matching the second optimum characteristic index, a shaft having a distri-bution of flexural stiffness close to said distribution of flexural stiffness of the shaft of the first golf club;

determining, based on the first swing index, a first opti-mum characteristic index indicating characteristics of the shaft for the first golf club suitable for the golfer, wherein the first optimum characteristic index includes the weight of the shaft for the first golf club or an optimum weight range thereof; and selecting, from among first candidate shafts for the first golf club selected as matching the first optimum char-acteristic index, a shaft having a distribution of flexural stiffness close to said distribution of flexural stiffness of the shaft of the first golf club, such that:

for each of the first candidate shafts for the first golf club selected as matching the first optimum characteristic index, the distribution of flexural stiffness of the first candidate shaft for the first golf club is compared with the distribution of flexural stiffness as the first optimum stiffness index suitable for the golfer based on the following equation (2):

$$F=F1+F2 \qquad \text{(2), wherein}$$

$$F1=|A36-B36|+|A26-B26|+|A16-B16|+|A6-B6|$$

$$F2=|(A36-A26)-(B36-B26)|1(A26-A16)-(B26-B16)$$
$$|+(A16-A6)-(B16-B6)|$$

A36 is IFC number at a position P1 on the shaft having the first optimum stiffness index suitable for the golfer, A26 is IFC number at a position P2 on the shaft having the first optimum stiffness index suitable for the golfer, A16 is IFC number at a position P3 on the shaft having the first optimum stiffness index suitable for the golfer, A6 is IFC number at a position P4 on the shaft having the first optimum stiffness index suitable for the golfer, B36 is IFC number at a position P1 on the shaft for the first golf club, B26 is IFC number at a position P2 on the shaft for the first golf club, B16 is IFC number at a position P3 on the shaft for the first golf club, and B6 is IFC number at a position P4 on the shaft for the first golf club; and from among the first candidate shafts, a shaft or shafts having a smallest F value are selected for the first golf club.

14. A non-transitory computer-readable storage medium having stored thereon instructions that, when executed by one or more processors, causes the one or more processors to perform a method comprising:

obtaining measurement values by measuring a swing motion of a first golf club by the golfer with a mea-suring device;

calculating, based on the measurement values, a first swing index related to the swing motion, wherein the first swing index includes at least one of an index indicating power output by the arms of the golfer during the swing motion, an index indicating power input to the first golf club during the swing motion, an index indicating energy exerted by the golfer during the swing motion, and an index indicating torque exerted by the golfer during the swing motion;

determining, based on a magnitude of the first swing index, a second optimum characteristic index showing characteristics of a shaft for a second golf club different from the first golf club, wherein the second optimum characteristic index includes the weight of the shaft for the second golf club or an optimum weight range thereof;

selecting at least one shaft for the second golf club matching the second optimum characteristic index;

calculating a second swing index different from the first swing index;

determining, based on the second swing index, a first optimum stiffness index suitable for the golfer, wherein the first optimum stiffness index indicates a distribution of flexural stiffness at a plurality of positions of a shaft of the first golf club;

selecting, from among second candidate shafts for the second golf club selected as matching the second optimum characteristic index, a shaft having a distribution of flexural stiffness close to said distribution of flexural stiffness of the shaft of the first golf club;

determining, based on the first swing index, a first optimum characteristic index indicating characteristics of the shaft for the first golf club suitable for the golfer, wherein the first optimum characteristic index includes the weight of the shaft for the first golf club or an optimum weight range thereof; and selecting, from among first candidate shafts for the first golf club selected as matching the first optimum characteristic index, a shaft having a distribution of flexural stiffness close to said distribution of flexural stiffness of the shaft of the first golf club, such that:

for each of the first candidate shafts for the first golf club selected as matching the first optimum characteristic index, the distribution of flexural stiffness of the first candidate shaft for the first golf club is compared with the distribution of flexural stiffness as the first optimum stiffness index suitable for the golfer based on the following equation (2):

$$F = F1 + F2 \qquad\qquad (2), \text{wherein}$$

$$F1 = |A36 - B36| + |A26 - B26| + |A16 - B16| + |A6 - B6|$$

$$F2 = |(A36 - A26) - (B36 - B26)| 1 (A26 - A16) - (B26 - B16) | + (A16 - A6) - (B16 - B6)|$$

A36 is IFC number at a position P1 on the shaft having the first optimum stiffness index suitable for the golfer, A26 is IFC number at a position P2 on the shaft having the first optimum stiffness index suitable for the golfer, A16 is IFC number at a position P3 on the shaft having the first optimum stiffness index suitable for the golfer, A6 is IFC number at a position P4 on the shaft having the first optimum stiffness index suitable for the golfer, B36 is IFC number at a position P1 on the shaft for the first golf club, B26 is IFC number at a position P2 on the shaft for the first golf club, B16 is IFC number at a position P3 on the shaft for the first golf club, and B6 is IFC number at a position P4 on the shaft for the first golf club; and from among the first candidate shafts, a shaft or shafts having a smallest F value are selected for the first golf club.

\* \* \* \* \*